US009997025B2

(12) United States Patent
Anderson

(10) Patent No.: US 9,997,025 B2
(45) Date of Patent: Jun. 12, 2018

(54) INSTANT LOTTERY SCRATCH TICKET ON-DEMAND PRINTING

(71) Applicant: BALLY GAMING, INC., Las Vegas, NV (US)

(72) Inventor: Peter R Anderson, Northbrook, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 106 days.

(21) Appl. No.: 15/203,626

(22) Filed: Jul. 6, 2016

(65) Prior Publication Data

US 2018/0012453 A1 Jan. 11, 2018

(51) Int. Cl.
*G06F 17/00* (2006.01)
*G07F 17/32* (2006.01)

(52) U.S. Cl.
CPC ........ *G07F 17/3267* (2013.01); *G07F 17/329* (2013.01); *G07F 17/3225* (2013.01); *G07F 17/3251* (2013.01)

(58) Field of Classification Search
None
See application file for complete search history.

(56) References Cited

U.S. PATENT DOCUMENTS 5,934,671 A * 8/1999 Harrison ................. A63F 3/069 273/139
6,958,014 B1 * 10/2005 Luciano, Jr. ............ G07F 17/42 283/101
7,625,279 B1 12/2009 Luciano, Jr. et al. .. G06F 19/00
7,758,413 B2 7/2010 Luciano, Jr. et al. .. G06F 19/00
8,074,570 B2 12/2011 Grotkowski et al. .. B42D 15/00
8,449,373 B2 5/2013 Luciano, Jr. et al. .. G06F 19/00
8,529,330 B2 9/2013 Luciano, Jr. et al. .. A63F 13/00
2002/0165021 A1 * 11/2002 Several .................. A63F 3/065 463/17
2003/0050109 A1 * 3/2003 Caro .................... G07C 15/005 463/17
2003/0207066 A1 11/2003 Killey ..................... B32B 31/00
(Continued)

FOREIGN PATENT DOCUMENTS

WO WO 2016/054357 A1 4/2016 ............. B41M 5/42

*Primary Examiner* — Paul A D'Agostino
(74) *Attorney, Agent, or Firm* — Marvin A. Hein, Jr.

(57) ABSTRACT

The present invention describes a lottery ticket system providing an instant scratch lottery ticket to a consumer on-demand. A customer vending device of the lottery ticket system may be used to receive consumer input. The consumer input may include selection of a lottery game and one or more play actions for an associated interactive game. A scratch lottery ticket having hidden and non-hidden portions collectively defining an outcome for the lottery ticket is printed on-demand by the vending machine using blank lottery ticket media. The customer input may or may not impact the outcome of the printed lottery ticket. The vending machine may also communicate with one or more network servers to exchange ticket information for lottery ticket generation, authentication, recordation, and redemption, in addition to performing episodic lottery games by managing linked records of ticket information. Lastly, on-demand lottery tickets may be generated using real-time promotional and marketing information.

20 Claims, 13 Drawing Sheets

(56) References Cited

U.S. PATENT DOCUMENTS

| | | | | |
|---|---|---|---|---|
| 2005/0239552 | A1* | 10/2005 | Lind | G07F 17/32 463/43 |
| 2006/0025213 | A1* | 2/2006 | Kane | G07C 15/005 463/29 |
| 2006/0094491 | A1* | 5/2006 | Breslo | A63F 3/06 463/17 |
| 2009/0131141 | A1* | 5/2009 | Walker | G07F 17/32 463/17 |
| 2009/0186680 | A1* | 7/2009 | Napolitano | G07F 17/32 463/17 |
| 2009/0263583 | A1 | 10/2009 | Mantell et al. | B05D 1/36 |
| 2009/0287580 | A1* | 11/2009 | Irwin, Jr. | A63F 3/0665 705/21 |
| 2010/0113124 | A1* | 5/2010 | Amirsadri | G07F 17/32 463/17 |
| 2010/0311496 | A1* | 12/2010 | Taylor | A63F 13/10 463/25 |
| 2010/0317423 | A1* | 12/2010 | Osborne | G07F 17/3223 463/17 |
| 2011/0086693 | A1* | 4/2011 | Guziel | G07F 17/32 463/17 |
| 2011/0190042 | A1* | 8/2011 | Connolly | A63F 3/06 463/17 |
| 2011/0272934 | A1 | 11/2011 | Lundgren et al. | B42D 15/00 |
| 2011/0275432 | A1* | 11/2011 | Lutnick | G07F 17/3232 463/25 |
| 2012/0145024 | A1* | 6/2012 | Scrymgeour | B41J 3/4075 101/483 |
| 2012/0235400 | A1* | 9/2012 | Scrymgeour | A63F 3/064 283/102 |
| 2014/0358753 | A1* | 12/2014 | Jones | G06Q 40/025 705/35 |
| 2016/0071366 | A1 | 3/2016 | Lind et al. | G07F 17/32 |

* cited by examiner

INSTANT LOTTERY SCRATCH TICKET ON-DEMAND PRINTING

FIELD OF THE INVENTION

This invention pertains generally to manufacturing devices, systems, methods, and electronic aids for lottery-based games. More particularly, the invention relates to an "on-demand" manufacturing and distribution system for printing and supplying scratch lottery tickets.

BACKGROUND OF THE INVENTION

Pull-tab lottery tickets manufactured using paper may include perforated sections (tabs) that may be removed (peeled, broken) to reveal one or more symbols initially hidden from view that indicate a corresponding prize. Scratch lottery tickets are similar, but instead use a series of layers of protective film to shield the symbols from the consumer until the film layers are removed ("scratched" off). A predetermined number of tickets may be specified for manufacture for the game (called a "deal") and may be separated into distinct "decks." Each deck has a finite number of associated tickets and a predetermined number of winning tickets specifying prizes of one or more various prize levels. When a uniform price for tickets of a deck is set, a selling price for each deck may be adjusted to ensure a guaranteed profit margin should each ticket in the deck be sold at the fixed ticket price. Lottery ticket decks may be manufactured (e.g., printed) and bundled for shipment at a centralized facility to be physically transported to purchasers such that display, purchase, or dissemination of the tickets by consumers can be easily performed. Stacks, strips, or rolls of tickets may be bundled to ease distribution and presentation of the tickets to consumers via store display, automated vending machines, hand-to-hand sales or dissemination, or any other propagating method. Once the tickets are dispensed to consumers, revealing of the hidden symbols may occur (by removal of the perforated/filmed sections) and the corresponding prize can be ascertained. Winning tickets may be redeemed (e.g., at a kiosk or retail shop) to collect or register for the corresponding prize.

The manufacturing and distribution method for lottery tickets detailed above has a number of important drawbacks. In order to sell lottery tickets, a retailer must have the lottery tickets in inventory and accessible, often requiring stockpiling lottery tickets, continued necessity for replenishment of depleted ticket decks, and unnecessary exposure to ticket theft, illegal inspection, and collusion.

A purely electronically-based scratch-based lottery or pull-tab ticket system also has drawbacks, including consumer-perceived result predisposition. Further, certain "electronic facsimiles" of lottery games may not be considered compliant with the definition of Class II gaming under the Indian Gaming Regulatory Act or may not be permissible under state lottery law. This may cause retailers or vending site operators to be required to negotiate the payment of fees with one or more jurisdictions prior to implementing such lottery games in an electronic form. The resultant decrease in revenue for a gaming provider is highly undesirable.

Accordingly, there is a need for a lottery ticket manufacturing and distribution system and method which overcomes one or more of these and other disadvantages associated with the prior art.

SUMMARY OF THE INVENTION

The present invention relates to a distributed manufacturing and distribution process for providing scratch lottery tickets, including but not limited to pull-tab and instant win scratch tickets. In one embodiment, the manufacturing and vending system comprises network communications performed between a secure and centralized ticket controller (i.e., a ticket management server system) and one or more client vending devices (e.g., kiosks), usually located at remote sites. In alternative embodiments, the ticket controller and vending devices may be located at the same location, and even in the same machine.

The ticket controller may manage one or more ticket pools for one or more lottery games and/or lottery game themes. The ticket controller may generate entries in the ticket pool using one or more of a series of random numbers designating the outcome (e.g., symbols and/or prizes) for each ticket in each ticket pool. The ticket pool entries are electronically stored in one or more databases accessible by the ticket controller via a network connection or internal communication bus. Ticket pools for differing games or game themes may be generated and stored independently or be collectively stored and entries shared among a number of different games or game themes.

The vending machines may be disposed locally or remotely from the ticket controller provided secured two-way communications may occur. The vending machine may also include a specialized printer device configured to print information relating to the lottery game. Printed ticket information may include both hidden and non-hidden portions that generate the outcome of the ticket. In one embodiment, a non-hidden portion of the ticket includes game theme information, game rules, and part of the information used to ascertain the game outcome. A hidden portion of the ticket may include information related to the ticket pool information used to ascertain the outcome (and associated prize) of a ticket corresponding to a particular entry of a ticket pool.

According to one aspect of the present invention, a gaming system is described comprising a gaming terminal including an electronic display device, one or more electronic input devices, a printer, and one or more controllers. The one or more controllers are configured to receive consumer input indicative of a purchase of a scratch ticket and one or more game play actions via at least one of the one or more electronic input devices. The scratch ticket includes a non-hidden portion and a hidden portion. The hidden portion may include one or more regions covered by an opaque material. One or more random elements are generated and in response to the consumer input, the printer prints imagery at the hidden and non-hidden portions of the scratch ticket that collectively determine the game outcome. The imagery at the hidden portion may be based on the random elements, and the imagery at the non-hidden portion may be based on the game play actions.

According to another aspect of the present invention, a gaming terminal is described comprising an electronic display device, one or more electronic input devices, a printer, and one or more controllers. The one or more controllers are configured to receive consumer input indicative of a purchase of a scratch ticket and one or more game play actions via the one or more electronic input devices. The scratch ticket includes a non-hidden portion and a hidden portion. The hidden portion may include one or more regions covered by an opaque material. One or more numbers are determined based upon one or more random elements. In response to the consumer input, the printer prints imagery at the hidden and non-hidden portions of the scratch ticket that collectively determine a game outcome for the ticket. The imagery at the hidden portion may be based on the random elements, and the imagery at the non-hidden portion may be based on the game play actions.

According to another aspect of the present invention, a method of operating an on-demand scratch ticket system is described. The ticket system comprises one or more controllers and a terminal including an electronic display device, one or more electronic input devices and a printer. The described method includes receiving consumer input indicative of a purchase of a scratch ticket and one or more game play actions via the one or more electronic input devices. The scratch ticket includes a non-hidden portion and a hidden portion covered by opaque material. One or more random elements are generated and the printer prints imagery at the hidden and non-hidden portions of the scratch ticket determining a game outcome for the ticket in response to the consumer input. The imagery at the hidden portion may be based on the random elements and the imagery at the non-hidden portion may be based on the game play actions.

Additional aspects of the invention will be apparent to those of ordinary skill in the art in view of the detailed description of various embodiments, which is made with reference to the drawings, a brief description of which is provided below.

Figure 1:
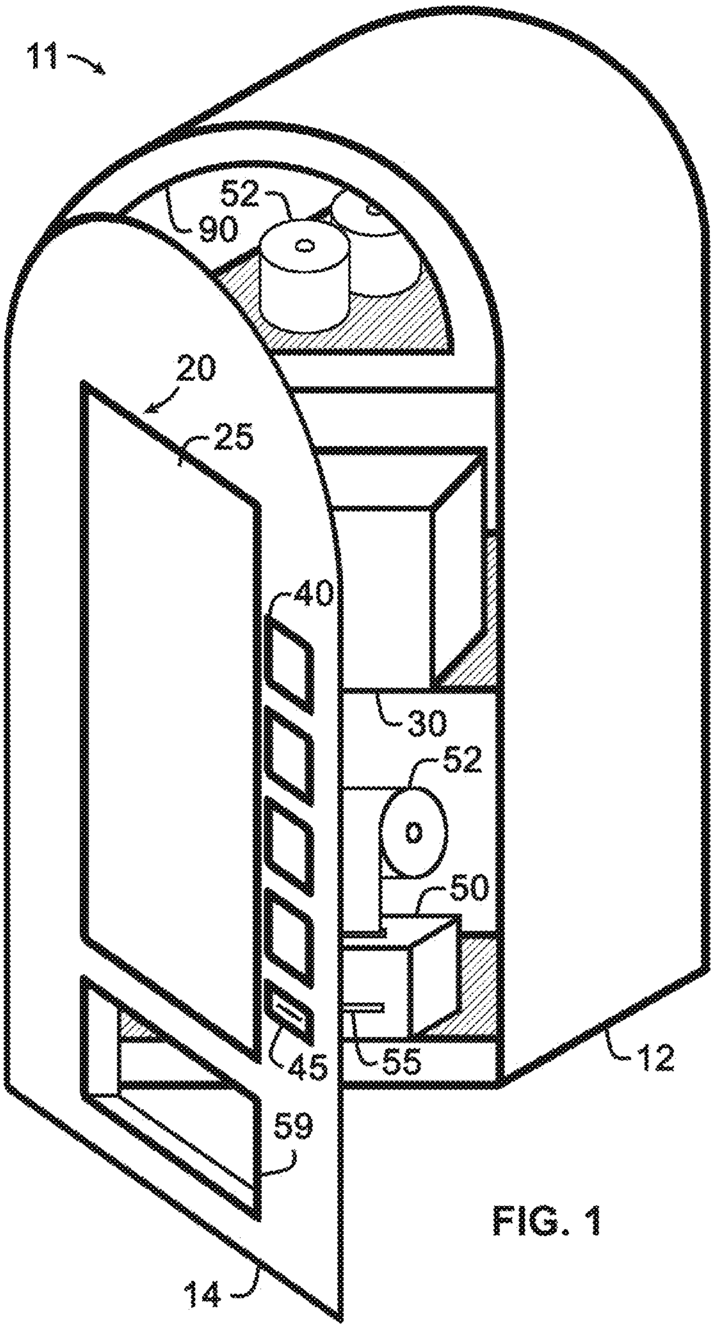
FIG. 1 is a perspective view of a free-standing kiosk according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "pull-tab ticket," "scratch ticket," "lottery ticket," and the like include ticket-based wagering games in which a consumer places at risk a sum of money or other representation of value by purchasing an entry, whether or not redeemable for cash, on an event with an uncertain outcome, including without limitation those having some element of skill. In some embodiments, the wagering game may involve wagers of real money, as found with typical instant ticket or lottery purchases. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game or lottery, or it may take another form that more closely resembles other types of social/casual games.

The generation of lottery tickets on-demand can significantly reduce complexity and overhead in addition to improving flexibility in maintenance and changing parameters for any ticket-based lottery game. The disclosed lottery system may be configured to provide on-demand lottery tickets for a number of specific lottery games having different attributes. The lottery game and ticket outcome may be presented as an amusement game presentation, an interactive game, a sweepstakes, a casino wagering game, or one of additional examples. Lottery games may include an entry into a promotional game having a set of predetermined outcomes. Additionally, the predetermined outcomes may be unassociated with any particular ticket, consumer, or machine prior to a request for consumer entry. Lottery and other game types may require ticketed entries having significant overhead for providing individual outcomes for tickets over the course of a game, gaming sessions, and additional or extended iterations of the game. Using predetermined outcomes unassociated with a pre-printed lottery ticket, maintenance demands for lottery ticket-based games are significantly reduced.

Referring now to FIG. 1, an exemplary kiosk 11 is shown for printing and presenting scratch lottery tickets to a consumer in one embodiment. The kiosk 11 includes a cabinet 12 that securely houses various input devices, output devices, input/output devices, internal electronic/electromechanical components, and connective wiring. In one embodiment, the cabinet 12 includes exterior walls, interior walls and shelves for mounting the internal components and managing the wiring, and one or more doors 14 that may be locked to restrict access to unauthorized personnel. For example, a front door 14 may require a physical or electronic key to gain access to the interior compartment of the cabinet 12 to deter tampering with the internal components.

The input devices, output devices, and input/output devices of the kiosk 11 are disposed on, and securely coupled to, the cabinet 12. By way of example, the door 14 includes access to some of the input and output devices including a primary display 20, a touchscreen 25 mounted over the primary display 20, a set of buttons 40, and an additional input device 45 (e.g., a bill validator/voucher reader). The input devices, output devices, and input/output devices enable consumer interaction with the kiosk 11 and programmed functionality by providing a means for consumer input and information display. For example, consumer input may include a consumer interacting with a graphical user interface (GUI) displayed via the display 20 and pressing regions of the touchscreen 25 to provide input. A consumer may also be able to provide input by making selections via actuation of one or more buttons 40. Consumer input may include a request for the generation of scratch lottery tickets having a desirable game theme, design, and/or format, among other interactions using the devices of the kiosk 11.

A set of hardware 30 couples to many or all of the internal components and acts to control and manage overall operations and communications of the kiosk 11. The hardware 30 may include one or more processors/controllers, one or more memory modules (a combination of both random-access, read-only, volatile, and/or non-volatile memories), one or more input/output interfaces for communicatively coupled devices, peripheral devices, etc. Firmware, software (potentially retrieved from a remote source over a network connection), or a combination of both provides programmatic instructions executed by one or more processors configure the hardware 30 to control the various components of the kiosk 11. For example, performing network and local device communications, presentation of visual content, consumer input interpretation, scratch lottery ticket generation, other vending functions, etc. In one embodiment, the hardware 30 communicatively couples to the internal components of the kiosk 11 via one or more physical interfaces providing communication between both internal components and external sources over an intervening network (e.g., remote servers or databases) (not shown). The internal kiosk components and the hardware 30 may be coupled in any of a number of different ways including the use of serial and/or parallel interfaces (e.g., RS-232, DB-25, etc.) and associated cabling, universal serial bus (USB) cabling, direct motherboard connection (e.g., via dedicated bus), wireless connectivity, etc. Further, the hardware 30 may include any number of distinct hardware modules (both internal and/or external to kiosk 11) that collectively operate to perform any or all of the described functions.

Other types of input devices, output devices, and input/output devices may be employed to provide visual and audio information to a consumer, in addition to receiving input from consumers. For example, a trackball, joystick, or mouse may be provided to help guide a cursor on the display 20, and/or a projector may display a portion of the display 20 on the wall next to the kiosk 11 (not shown). Further, the buttons 40 may display imagery thereon (e.g., thin film transistor (TFT) or liquid crystal display (LCD) buttons) indicating what effect the button will have when pressed. The imagery displayed by the buttons 40 may be programmed to change as the effect of the input changes over time.

The input devices, output devices, and input/output devices may also enable a consumer to participate in one or more interactive games. The display 20 may display information associated with wagering games, non-wagering games, community games, progressive jackpots and games, advertisements, available services, premium entertainment, network-based communication (e.g., text messaging, emails, browsers, etc.), alerts, announcements, broadcast information, subscription information, etc. The kiosk 11 may be provided with a GUI that enables a consumer to specify an appropriate mode of operation such that the kiosk 11 performs a desired function.

The kiosk 11 may also include one or more input devices 45 configured to accept currency (cash monies, bills, coins, etc.) or other forms of vending credit (e.g., a currency ticket, read reader, etc.) presented by a consumer. Vending credit may be generated using a variety of methods: vouchers or cashless tickets, tokens, electronic accounts (such as consumer accounts, bank accounts, credit account, etc.) accessed via bearing instruments such as magnetic or smart cards requiring a personal identification number (PIN), etc. Once a customer has established sufficient vending credit, the customer is able to request purchase of one or more scratch lottery tickets in an "on-demand" manner by exchanging a portion of the vending credit for lottery tickets or games. The operation of generating and vending on-demand lottery-based tickets is described in further detail below.

The kiosk 11 may also include other types of input devices, output devices, and input/output devices including one or more consumer-accessible ports (e.g., audio output jack for headphones, video headset jack, USB port, wireless transmitter/receiver, etc.) (not shown). It should be understood that numerous other peripheral devices and other elements exist and are readily utilizable in any number of combinations to create various forms of a gaming machine in accord with the present concepts.

The kiosk 11 also includes a printer 50 configured to produce imagery on one or more sections of a lottery ticket media roll 52, thereby forming lottery tickets. One or more of the lottery ticket media rolls 52 are fed into a slot of the printer 50 and sections of the roll 52 are correspondingly imprinted with imagery in accordance with instructions performed by the hardware 30. A perforation or clipping may be used to separate distinct lottery tickets printed on the lottery ticket media. The printed sections of a lottery ticket media roll 52 exit the printer through a slot 55 and become accessible to the consumer via an access slot 59 in the door 14. In one embodiment, in response to the consumer input via one or more components of the kiosk 11, the printer 50 generates imagery on the lottery ticket media that generates the scratch lottery tickets having an outcome of the lottery game for the consumer.

The kiosk 11 may also have one or more internal compartments 90 secured via one or more locking mechanisms (not shown). A compartment 90 may be used to store or house additional internal electronic components (e.g., communication or processing hardware modules), excess lottery ticket media rolls 52, and/or other additional equipment or materials accessible to authorized individuals having access to the internals of the kiosk 11.

Figure 2:
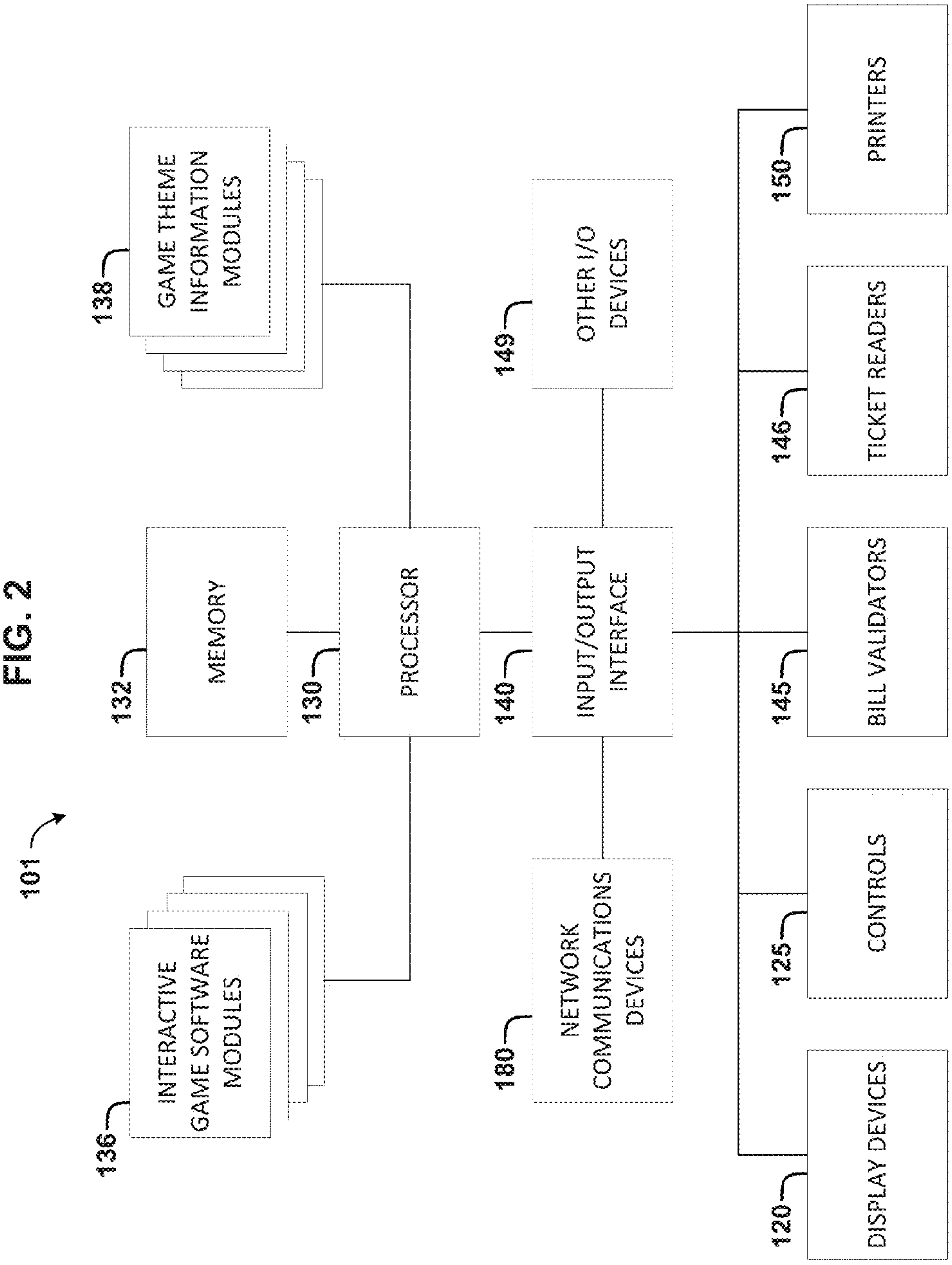
FIG. 2 is a schematic view of a free-standing kiosk according to an embodiment of the present invention.

Referring now to FIG. 2, there is shown a block diagram depicting an exemplary kiosk 101 in accordance with one embodiment of the present invention. The kiosk 101 includes a set of components electronically coupled together via one or more of dedicated communication busses, modular wiring, and/or wireless connectivity. Communication with internal components of the kiosk 101 may be local and limited (e.g., between components that are integrated within a single machine) and/or rely upon a spanning network (e.g., between components that reside on separate discrete machines). Communication exchanged between system components may include data, instructions, seed values, consumer input information, consumer account information, game information, ticket information, video and audio presentation information, etc.

In one embodiment, the set of components shown comprising the kiosk 101 are structured and configured as described herein, however, the kiosk 101 may comprise various combinations of components (both recited and missing) that do not depart from the spirit and scope of the invention and still carry out functions in accordance with the embodiment. Some aspects of the disclosure may be implemented using one or more generalized computer systems used to automate portions of the generation of on-demand tickets. Additionally, various aspects of the disclosure may be implemented as specialized hardware and/or as software executing in specialized hardware. Embodiments may include specialized functionality performed by a programmed kiosk 101 and/or distributed among a variety of disparate computers via a network.

The kiosk 101 includes at least a primary processor 130 that coordinates the interaction and communication between various components. The processor 130 may include any number of modularly separate processing units that collectively operate together to achieve the desired implementation. The processor 130 accesses a local memory 132 comprising one or more addressable memory modules storing various forms of digital data, including but not limited to descriptive data, programmatic instructions, functional input/output communication libraries, one or more application programming interfaces (API), graphical data, etc. The memory 132 may include computer readable and/or writeable volatile and/or non-volatile recording mediums in which data and instructions are stored that define a program to be executed by the processor 130. Additionally, information may be stored in the memory 132 for processing by the processor 130. The memory 132 may include any combination of volatile random access memories (e.g., dynamic random access memory (DRAM) or static random-access memory (SRAM)) or non-volatile random access memory (NVRAM) (e.g., electrically erasable programmable read-only memory (EEPROM) or flash memory) storing accessible information.

The kiosk 101 may incorporate components associated with a general-purpose computer system and be programmable using a high-level computer programming language. The kiosk 101 may be also implemented using specially programmed, special purpose hardware. The kiosk may become special purpose hardware in response to programing and configuration with non-general purpose functionality. The kiosk 101 may include a commercially available processor 130 such as the well-known Pentium class processor available from the Intel Corporation or another type of widely available processor. The processor 130 may execute an operating system and/or programs stored in memory 132 or a dedicated read-only memory segment like firmware or a specially-programmed, special-purpose hardware module (e.g., an application-specific integrated circuit (ASIC)). An operating system may include for example, Windows XP, Windows 7, or Windows 10, available from the Microsoft Corporation, MAC OS System X available from Apple Computer, the Solaris Operating System available from Sun Microsystems, or one or more UNIX/LINUX variations available from various sources, among others.

The processor 130 and operating system together define a computer platform where application programs may be written in high-level programming languages to impart specific functionality to one or more components of the kiosk 101. It should be understood that the invention is not limited to any particular computer system platform, processor, operating system, or network type. Also, it should be apparent to those skilled in the art that the present invention is not limited to any specific programming language or computer system for configuring the system hardware. Thus, it should be appreciated that any suitable programming language and other computer systems may be used to realize the invention. Further, aspects of the disclosure may be implemented in software, hardware, firmware, or any combination thereof. Further, such methods, acts, systems, system elements and components thereof may be implemented as an integrated part of the kiosk 101, other computer system, or as an independent component in communication with the kiosk 101.

The memory 132 may additionally hold a local or duplicate copy of remotely stored information or code that may be remotely accessed and used locally by the kiosk 101 to perform one or more of its various functions. For example, either separate from, or contained within the memory 132 is a set of interactive game software modules 136 and a set of game theme information modules 138 that are used by the processor 130 to conduct interactive games with the consumer and store image and format information relating to the available various game options and lottery ticket layouts. In one embodiment, the processor 130 causes data to be read from one or more of modules 136, 138 into memory 132 that provides faster access to the information by the processor 130 than direct access to modules 136, 138. The processor may manipulate the data within the modules 136, 138 and copy the data to the memory 132 after processing is completed. A variety of mechanisms are known for managing data movement between internal memories such as memory 132 and modules 136, 138, but the invention is not limited thereto. The invention is also not limited to a particular memory or storage system or type.

The processor 130 also interfaces with at least one input/output (I/O) interface 140 coupling to other electronic components of the kiosk 101. Information exchange between the processor 130 and the various components of the kiosk 101 may occur through the I/O interface 140 which may comprise one or more physical interfaces (e.g., dedicated bus, standardized/modular port, wire, or defined wireless connection). In one embodiment, the I/O interface 140 electrically communicates with one or more display devices 120, one or more controls 125, a bill validator 145, a ticket reader 146, an optional set of additional I/O devices 149, one or more printers 150, and a network communication device 180.

The display devices 120 may include a kiosk touchscreen display device similar to display 20. The display devices 120 may include a monitor or other video output device (e.g., LCD panel) for communicating ticket advertising, purchase information, desired selections, and result output information to the consumer. The output of the display devices 120 may relate to a specific game or game theme derived from one or more of the game theme information modules 138 and consumer input. For example, when the kiosk 101 is requested to display ticket information by a consumer, relevant display information (e.g., reels, cards, dice, random numbers, or other game theme data, graphics, sound or animation, etc.) may be obtained from the game theme information module 138 by the processor 130 for output to one or more of the display devices 120. In alternative embodiments, one or more additional I/O devices 149 may be used for display, e.g., a set of electromechanical slot reels controlled by the processor 130 used to display at least a portion of a corresponding outcome of a purchased ticket having a "slot-based theme."

The controls 125 may comprise input buttons, switches, touch-screen controls, and/or other input controls to allow a consumer to provide input to the kiosk 101. Consumer input may include specified options, attribute selections, game commands, etc. Additional devices that may be considered as controls 125 for a kiosk 101 may include a touchpad, pointing device, gesture indicator, etc.

The bill validator 145 and the ticket reader 146 operate to receive an indication of vending credit or other information bearing instruments from the customer such as currency (e.g., bills), voucher or ticket credits, etc. Likewise, the I/O devices 149 may include other input, output, or input/output devices not specifically mentioned. Among these are coin or token acceptors that can be used to provide vending credit for consumers. Various other devices may be coupled to the kiosk 101 and processor 130 to provide specific functionality, for example, cameras, a virtual reality headset, stereo headphones, and/or microphones may be employed to connect a consumer with a customer service representative.

In some embodiments, a printed scratch lottery ticket may be re-inserted to the kiosk 101 and read by the bill validator 145 or the ticket reader 146 for redemption of any associated award amounts. In response, an increase of available vending credit may occur for additional ticket purchases. In this case, the kiosk 101 also functions as a redemption machine for redeeming the winnings of a ticket. The verification and redemption of lottery tickets is well known in the art and may comprise verifying the transaction associated with the lottery ticket. For example, a bar-code indicating the transaction of the scratch lottery ticket may be verified against a locally-copied or remotely-stored transaction database to determine or confirm authenticity of the award amount associated with the transaction. In other cases, the transaction information on the bar-code corresponding to the transaction may be "self-authenticating" (i.e., requiring no verification of information against a transactional database record). Once verified or authenticated, an award amount may be established as vending credit for usage in purchasing additional lottery-based tickets on the kiosk 101.

The printers 150 provide output to the consumer that may include an indication of a transferrable currency balance (e.g., voucher ticket), an on-demand scratch lottery gaming ticket (i.e., generated at the time of purchase), or other printed material (e.g., redemption coupon). In one embodiment, the lottery ticket media (e.g., rolls 52) is secured and remains inaccessible until printing is completed and a section of the lottery ticket media is delivered to the consumer with printed information. The printing of scratch lottery tickets may occur locally at the kiosk 101 or be transferred to another printing device; in both cases, this alleviates any need for printing the tickets at a central manufacturing site and any required subsequent distribution for the tickets.

In one embodiment, one of the printers 150 includes a thermal printer element provided to print imagery onto thermal lottery ticket media. Thermal printing is a digital printing process producing a printed image by selectively heating coated thermochromic paper (or thermal-sensitive paper as it is commonly known) as the paper passes over a print head of the thermal printer. The coating of the paper turns black in the areas where it is heated, producing an image. Some direct thermal printers can print both black and an additional color (e.g., red) by applying heat at two different temperatures to the paper. A thermal printer compatible with one embodiment of the invention is sold commercially by the company "Nanoptix" (699 Champlain Street, Dieppe, New Brunswick, E1A 1P6 CANADA). Controller boards internal to the one of the printers 150 or coupled to the I/O interface 140 may include software or embedded firmware to manage the thermal printer mechanisms. In one embodiment, firmware manages multiple bar code types, graphics, and logos, and enables an administrative user to choose between different resident fonts (e.g., Asian fonts) and character sizes for printing. The controller boards may also drive various sensors for alerts or errors such as paper low, paper out, door open, etc. A controller board may be coupled to the I/O interface 140 or printers 150 via a variety of interfaces, such as a dedicated bus, RS-232, parallel, USB, and wireless communication media.

In one embodiment, a thermal printer uses thermo-sensitive paper inserted between a thermal print head and a platen. The thermal printer sends an electric current to the heating elements of the thermal print head, generating heat. The heat activates the thermo-sensitive coloring layer of the paper changing the color of the paper where heated. The heating elements are usually arranged as a matrix of small closely spaced dots, similar to a dot-matrix printer. In one embodiment, the paper is impregnated with a solid-state mixture of a dye and a suitable matrix (e.g., a combination of a fluoran leuco dye and an octadecylphosphonic acid). A thermochromism process is performed when the matrix is heated above its melting point, the dye reacts with the acid, shifts to its colored form, and the changed form becomes conserved in a metastable state as the matrix again solidifies.

Some thermal printers are capable of projecting heat through an opaque foil and imprinting imagery upon the underlying thermal paper such that the printed imagery is not readily visible until the foil is removed from the paper. By masking specific areas of a preformed paper ticket, portions of the ticket may be shielded by an opaque cover to conceal printed information, such as game symbols or other portions of game outcomes. Other sections of the ticket need not be covered by the opaque cover and may include printed information that relates to the printed lottery ticket itself. For example, a serial number, bar-code, and/or quick response code (QR code) may be printed on the scratch lottery ticket corresponding to the purchase transaction (e.g., draw or ticket transaction identification, ticket session identification, purchase session identification, etc.). Thus, the printers 150 may be used to print information on thermal media for a scratch lottery ticket having a hidden portion and non-hidden portion. The hidden portion of the scratch lottery ticket may include game symbols or a winning prize amount being covered by an opaque cover. The non-hidden portion of the scratch lottery ticket may include game theme imagery, game rules, potential winning combination information, transaction information, etc., not shielded by an opaque cover.

The nature of the opaque cover is not limited to foil and may extend to other materials like heat-conductive paper or particular chemical films. For example, pull-tab lottery tickets may also be generated on-demand by printing onto a blank paper ticket with selected sections having an upper media layer and a lower media layer, wherein the upper media layer shields sections of the lower media layer that contains imagery. In this way, the selective application of heat to specific regions of the ticket media enables printing of imagery on both a hidden portion and a non-hidden portion of the lottery ticket.

In one embodiment, the combination of the printed information and imagery in the hidden portion and the non-hidden portion of the lottery ticket collectively generate the outcome for the ticket. For example, a set of random numbers are determined and printed in a hidden portion of the scratch lottery ticket. Comparisons of the random numbers are made to a set of additional numbers (random or consumer-selected) printed in a non-hidden portion of the ticket. The printed ticket information may be derived from a combination of information stored locally (e.g., game theme information module 138) and information obtained by the processor 130 from a remote source via a network communication device 180 at the time of purchase. In one embodiment, the random numbers are based upon a centralized pool of lottery ticket records. At least some of the information printed on the ticket may be provided by one or more game theme information modules 138 containing the requisite information for generating ticket graphics, logos, and other indicia, and may be accessed by the processor 130 for generating the printed scratch lottery ticket during operation. This enables the kiosk 101 to provide on-demand scratch lottery tickets for multiple game themes using the same kiosk 101 by dynamically generating and printing graphics of the relevant game theme onto the purchased ticket.

The kiosk 101 also includes one or more network communication devices 180 that couples the kiosk 101 to one or more external networks (e.g., the Internet). A network communication device 180 may include a network card or serial device for communicating with one or more remote servers, other kiosks, or with other network devices (e.g., back-end servers) via a local or wide-area network (not shown). The network communication device 180 may include any wired or wireless connectivity electronics that interface with other computing devices over a network (whether internal to or extending beyond the kiosk 101).

Figure 3:
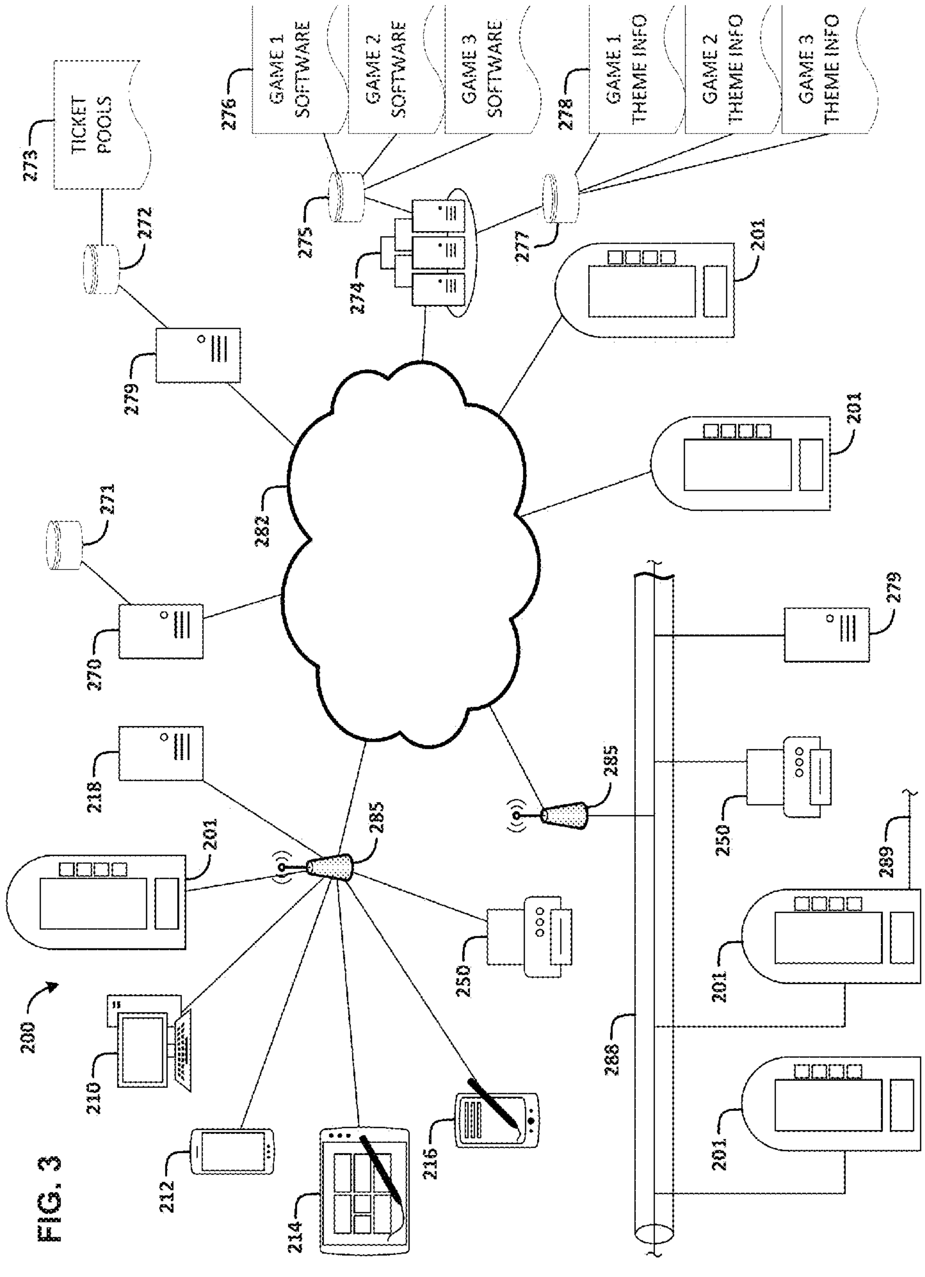
FIG. 3 is a schematic view of a lottery ticket gaming system according to one embodiment of the present invention.

Referring now to FIG. 3, an exemplary lottery system 200 is shown in one embodiment of the invention. The lottery system 200 includes a number of kiosks 201 that are generally geographically separated. Communicative coupling is provided to a common wide area network (WAN) network 282 (e.g., an internet), sometimes through a wired or wireless access point 285 that may be coupled to a local area network (LAN) 288. A kiosk 201 may be one of various proximal electronic devices (e.g., a personal computer 210, a smart phone 212, a computing tablet 214, a personal data assistant (PDA) 216, and/or a server 218) using a common network access point 285 to communicate and interact with each other. A printer 250 may also locally accessible for the printing of receipts, game outcomes, reports, and/or on-demand scratch lottery tickets in accordance with the invention. A kiosk 201 may also act as a gateway to another network 289, for example, via Ethernet or USB (or any other) cabling, or a wireless medium, that connects other peripheral or computing devices, including the printer 250.

One or more local or remote servers 270, 274, 279 may manage and store various types of information used by a kiosk 201 and other devices to play interactive games and generate scratch lottery tickets. The servers 270, 274, 279 may provide lottery ticket data and/or interactive games on-demand to purchasing customers. For example, one or more remote servers 270, 279 or server farms 274 may manage or provide access to one or more (potentially distributed) databases storing information for generating lottery tickets on-demand and/or storing information related to current or previously generated lottery tickets. In various embodiments, one or more servers 270, 279 may be operatively connected to both WAN and LAN media, either separately or in combination, and the operations and workload of any single system may also be distributed across a plurality of systems (as exhibited by a server farm 274).

For example, lottery ticket information may be obtained from one or more of a database 271 containing a list of available games and ticket types that a particular kiosk 201 is authorized to provide, a database 272 managing access to a set of ticket pools 273, or databases 275/277 storing a set of game software modules 276 and game theme content information 278, respectively. The information contained in any or all of these databases may be redundant, centralized, and/or distributed in various ways known to skilled artisans. Further, any of the servers 270, 274, 279 may manage or have access to any or all of databases 271, 272, 275, 277.

Other databases (not shown) or records within one or more databases 271, 272, 275, 277 may include additional information, for example, records of episodic lottery ticket chains and outcomes, transaction identification records, outstanding prizes in one or more sets of tickets to be awarded, locational/geographical sales records, accounting information, ticket distribution patterns, additional gaming-related content (games provided by third-party developers), customer or distributor account information, lottery results originating from other sources (e.g., POWERBALL™), sporting event information, etc. Any information from any of these sources may be used during the generation and/or verification of an on-demand lottery ticket.

In one embodiment, a kiosk 201 is associated with one or more (random or not) seed values that permits dynamic generation of lottery ticket information and lottery tickets when needed. A seed value may be used by a deterministic function to provide a randomized and repeatable output to generate some or all of a lottery ticket information used to derive an outcome for a lottery ticket. The seed value and/or the ticket information may be received and/or transmitted in response to a ticket generation request, dynamically generated locally at a kiosk 201 and remotely reported, or locally generated and stored for later inspection and verification. Transaction identification information associated with particular purchases or lottery tickets may include an indication of the use and/or derived results of a seed value for future lottery ticket verification.

One or more ticket pools 273 may include values defining respective predefined outcomes for entire collections of lottery tickets of a given lottery game. In other embodiments, the ticket pools 273 include lottery ticket information and predefined outcome or seed values associated with the tickets of a particular ticket deck of a lottery game. Values stored within the ticket pools 273 may be pre-generated by a dedicated and authorized server to predetermine the outcomes for each lottery ticket deck or the entire lottery ticket game. Any appropriate algorithm may be used to generate ticket outcomes as are known in the art. In yet other embodiments, the ticket pools 273 provide information such that the lottery ticket information may be randomly or pseudo-randomly generated using a random number generator (RNG) in a kiosk 201 or another network entity (e.g., an assigned, random, or pseudo-random seed value). In short, the ticket pools 273 store at least a portion of a lottery ticket information. The lottery ticket information may enable identification of a particular outcome for generation of a given lottery ticket at an authorized device. In one embodiment, the lottery ticket information includes encoded values that correspond to an outcome for a particular ticket and the lottery ticket information is delivered to a requesting entity (e.g., kiosk 201) upon request. The lottery ticket information stored within a ticket pool 273 may also be used to verify or redeem previously purchased and printed lottery tickets.

In one embodiment, the number of tickets in a lottery ticket deck maintained by a kiosk 201 depletes over time as purchases are made by consumers and requests for access to updated or new ticket pools 273 and other lottery game information may be required. In one embodiment, a local ticket pool maintained by a kiosk 201 is supplemented when the number of remaining ticket information records in the ticket pool drops below a predetermined threshold. For example, the records of a ticket pool 273 may be supplemented or appended when the number of remaining ticket information records in the pool are half consumed.

Additional details and specifics related to on-demand ticket purchasing and distribution, server-managed lottery ticket pools, transaction-based lottery ticket tracking and receipts, and more, may be found in U.S. Pat. No. 7,758,413 B2 and U.S. Pat. No. 8,449,373 B2, in addition to United States Patent Application Publication 2010/0311496 A1, all of which fully incorporated by reference into this disclosure in their entirety.

The game software modules 276 may include executable software code, libraries, and programs that may be used to specifically program a kiosk 201 or other connected device (e.g., computing devices 210, 212, 214, 216). The modules 276 may specify a kiosk 201 to perform an interactive game and receive consumer input (e.g., detect one or more game play actions via a touchscreen or other input device) impacting the outcome of the printed lottery ticket. For example, prior to the printing of the ticket, an interaction may occur via a GUI of a kiosk 201 allowing a consumer to select one or more indicia on a pick field that alters the top prize of the resulting lottery ticket. Other examples include spinning a wheel (physical or virtual) that grants one or more alterations of the lottery game dynamics. Another example includes a consumer selecting the winning numbers for use in one or more aspects of the lottery game on the ticket.

An alteration of the lottery ticket outcome may include an increase in one or more award amounts, a modification of the pay table for the ticket, an increase in the number of winning matching symbols, addition of an award multiplier, alterations of one or more winning matching symbols, etc. An alteration may also modify the probability of a winning result and/or an amount of award for a winning result. A volatility for the lottery ticket may also be determined by the consumer input, where the probability of obtaining an award for the lottery ticket is inversely proportional to the amount of the award. In some embodiments, a set of alterations may be compiled until a predetermined event occurs (e.g., selection of an "end game" or "print ticket" indicia). The resulting printed lottery tickets will reflect the lottery ticket gaming alterations garnered during the reception of consumer input and events of the interactive GUI gaming feature.

The game theme information modules 278 may include various graphical and textual elements that are used for generating and printing the lottery tickets of a particular game. For example, a specific game theme information module 278 relating to a MONOPOLY™-based lottery game may include a uniform header image for the top of each printed lottery ticket, a font type/size, and a general layout format for the printed regions of each lottery ticket. Lottery tickets generated for other theme-based games may have a completely distinct set of images and criteria as specified in the modules 278.

The modules 276, 278 may contain a wide variety of games and content in one or more digital libraries that include all of the examples of this application, and additionally many more. The information of the game software modules 276 and the game theme information modules 278 may be remotely accessed and/or locally copied to a kiosk 201 by retrieval and storage in local memory (e.g., modules 136, 138) to provide improved access to the information by the kiosk 201. A kiosk 201 or other device may be configured by the transfer of executable code (e.g., modules 276) and/or game-specific content (e.g., modules 278) on a periodic basis via communications over a network (e.g., network 282, 288, 289). Alternatively, a kiosk 201 may be configured via software installation by physical delivery (e.g., via USB flash drive), firmware installation, etc.

Lottery ticket creation may include the assembly of ticket information gathered from multiple servers 270, 274, 279, etc., into representative imagery of the physical ticket sent to the kiosk 201 for direct printing. In other embodiments, the ticket information is gathered and assembled at the kiosk 201. A deck of lottery tickets may be assembled as a group using distributed information and stored in a local server 218 which may be accessed by one or more kiosks 201 to purchase tickets. The present invention is not limited to any of these specific configurations as recognized by one skilled in the art.

A server 279 may also be used to store copies of databases and ticket information records, ticket pools, consumer vending balances, transaction identifications, purchases histories, etc. A server 279 may also be configured to print lottery tickets at a local printer 250 upon receipt of a verified purchase or request. In one embodiment, a server 279 may be configured to identify and authenticate consumers using a frequent consumer membership card/number and manage/maintain consumer and specific game information in one or more associated databases. The server 279 may also be configured to communicate with one or more remote databases (e.g., database 271, 272, 275, 277) to retrieve and store ticket, consumer, and account information. The server 279 may be specific to a location (e.g., owned and operated by a casino or wagering facility), be leased or owned by a lottery jurisdiction or lottery providing entity, or be offered as a third-party management suite of programmed equipment. The nature and operation of the server 279 should not be limited and may include functionality not expressly recited here without detracting or departing from the scope and intention of the invention. Further, the server 279 may be accessible by all computers communicatively coupled to network 282 and utilized to provide ticket information records, transaction identifiers, ticket pools, consumer accounts, etc., across all networked terminals.

Various aspects of the invention may be distributed among one or more of the computer systems 210, 212, 214, 216, 218 or servers 270, 274, 279, etc., configured to provide a service to one or more client computers, or to perform a partial or overall task as part of the distributed lottery system 200. For example, various aspects of the invention may be performed on a client-server system that includes components distributed among one or more server systems 270, 274, 279 that perform various corresponding functions according to various embodiments of the invention. These components may incorporate directly executable, intermediate, or interpreted code modules that may require transfer using digital communication over a communication network (e.g., the Internet) using a known communication protocol (e.g., TCP/IP).

It should be appreciated that the invention is not limited to executing on any particular computer system or group of computer systems. Also, it should be appreciated that the invention is not limited to the use of any particular distributed architecture, network, or communication protocol. The components discussed above can reside on one system or distributed across multiple systems in a variety of ways. Various embodiments of the present invention may be programmed using an object-oriented programming language, such as SmallTalk, Java, C++, or C# (C-Sharp), and/or any other object-oriented programming language. Alternatively, functional, scripting, and/or logical programming languages may be used to configure networked computers to perform one or more tasks to realize the invention. Various aspects of the invention may be implemented in a non-programmed environment (e.g., documents created in HTML, XML or other formats that, when viewed in a window of a browser program, render aspects of a graphical user interface or perform other functions).

In one embodiment, distributed component installations may include a central ticket generation server and other distributed systems configured to collectively perform various functions of a ticket generation and recordation operation and transmit ticket information (including a ticket result) to a central ticket server. For example, a server 270 may receive a ticket generation request from a kiosk 201, and pass the received ticket generation information to a seed value component executing on server 270 (or alternatively, a server 279). A seed value component can be configured to accept a seed value directly and/or accept information used to generate a resultant seed value. The seed value component may also be configured to combine multiple received values to generate a resultant seed value used for ticket or ticket component selection. A deterministic component may also be employed to generate a random value through use of a seed value. In one embodiment, the result of the deterministic operation, although random, is deterministic and predictable when a corresponding seed value is known. The output of the deterministic operation can be known and used with or without the seed component. The output may then be submitted to a server farm 274 where one or more components of the ticket information are collated and transmitted to the kiosk 201.

The above is merely an illustrative embodiment of a ticket generation system. Such an illustrative embodiment is not intended to limit the scope of the invention, as any of numerous other implementations of a ticket generation system, for example, variations of network topology, host server messaging, distributed computing, are possible and are intended to fall within the scope of the invention. Placement of various functions can occur on one or more computer systems, designated servers, hosts or other configurations. None of the claims set forth below are intended to be limited to any particular implementation of a ticket generation system unless such claim includes a limitation explicitly reciting a particular implementation.

Figure 4:
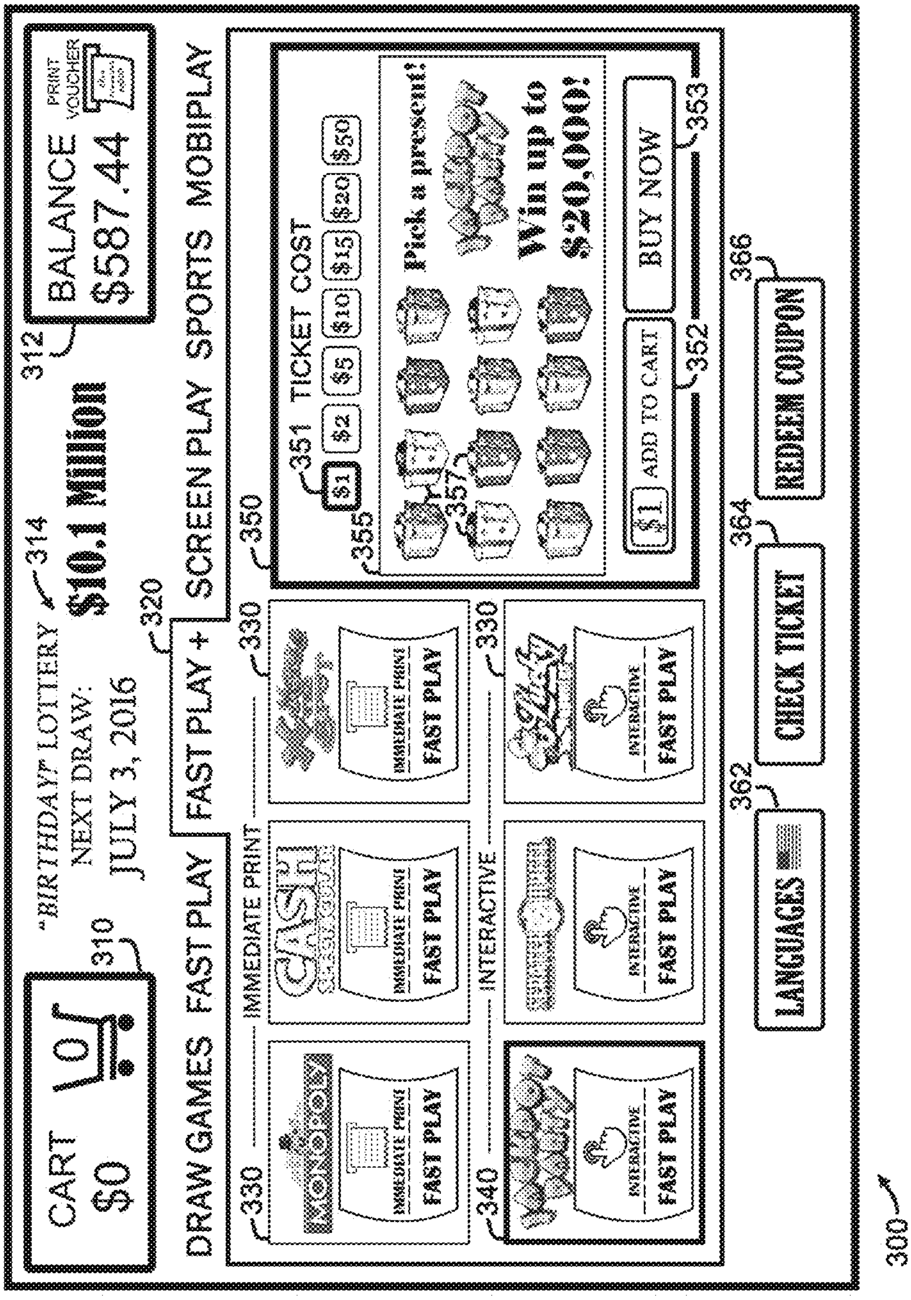
FIGS. 4-6 are images for an exemplary graphical user interface (GUI) displayed on a screen of an on-demand lottery ticket generation kiosk according to an embodiment of the present invention.
Figure 5:
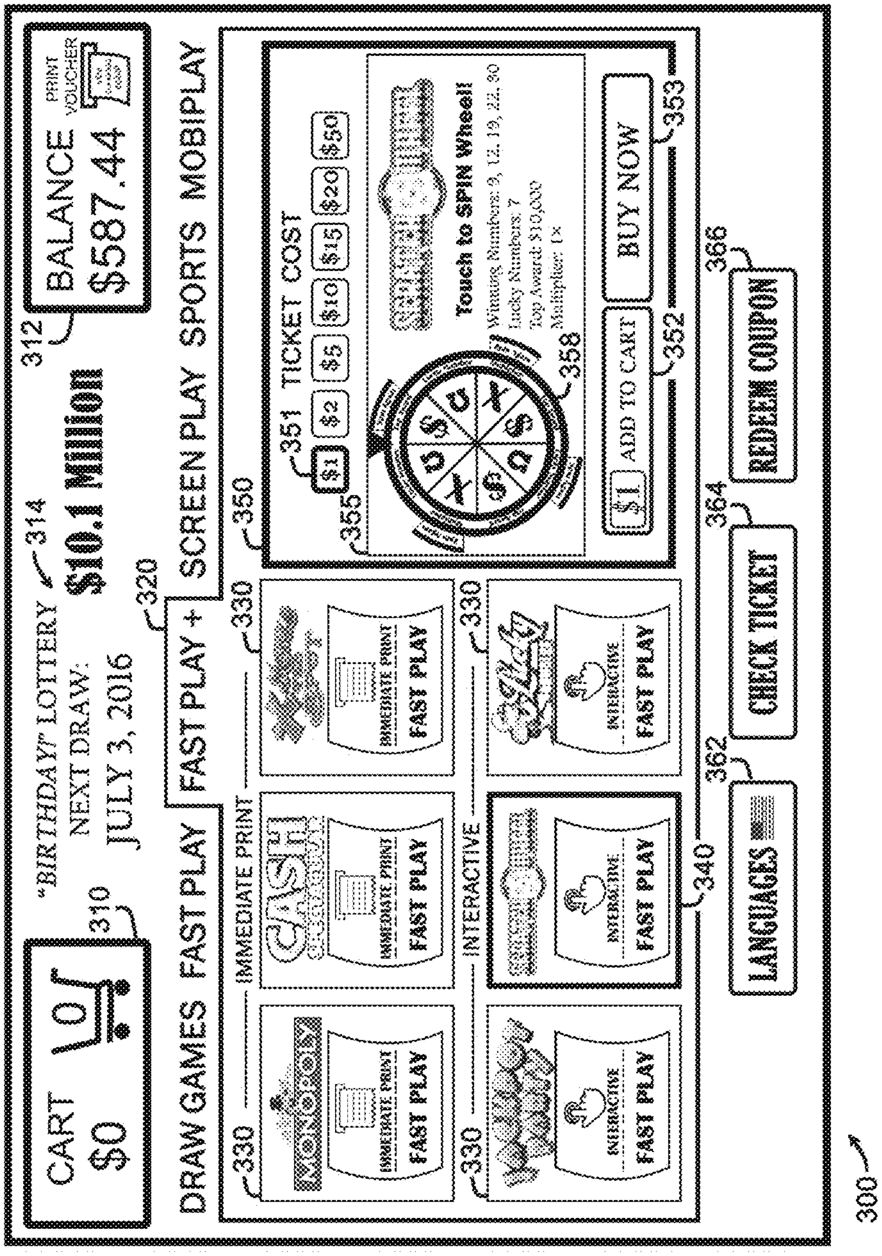
Figure 6:
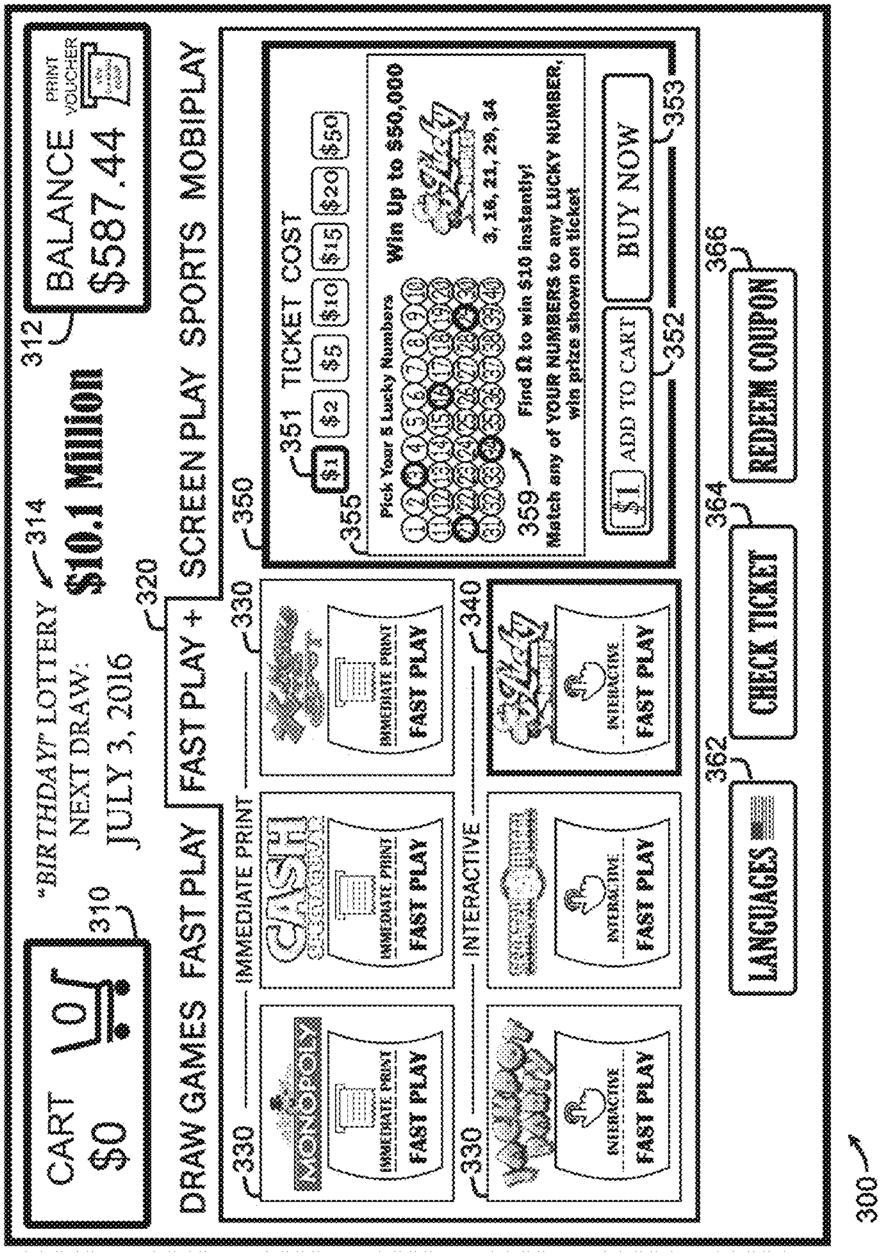

Referring to FIGS. 4-6, an exemplary graphical user interface (GUI) 300 is shown as displayed on one or more of the kiosks 201 during operation in one embodiment. A particular kiosk (e.g., kiosk 201) may have variance in an associated GUI (e.g., GUI 300) based upon the hardware and software capabilities of the kiosk and the information requested and received over the network and local sources (e.g., databases 275, 277), as implemented. The system 200 may additionally allow locational, regional, and/or jurisdictional customization of the presentation of on-demand lottery tickets by controlling content delivered to the kiosk 201 based upon its location and regulatory restrictions.

Referring specifically to FIG. 4, the GUI 300 includes an upper banner including a shopping cart meter 310 displaying a running total of vending credits the consumer is spending in the current transaction, a vending credit meter 312 displaying the total vending credits the consumer has available to spend, and a central banner 314 displaying rotating advertising content such as an alert regarding an upcoming lottery event and an associated prize amount for the upcoming lottery drawing.

The GUI 300 also includes a tabular menu 320 that may be used by a consumer via one or more input devices (e.g., kiosk touchscreen 25) to select one or more of the available menu options and specify a type of ticket, game, or other feature that interests the consumer. For example, a "DRAW GAMES" menu option may present additional menu selections for purchasing a lottery ticket in one of a series of offered lottery games for the corresponding jurisdiction.

In one embodiment, a selection of an option via the menu 320 presents a set of additional gaming option indicia 330 for selection by the consumer. Use of one or more input devices results in an indicia 330 becoming a highlighted selected indicia 340. In response to selection of indicia 340, an accompanying game window 350 presenting gaming options specific to the selected indicia 340 is presented.

The game window 350 includes denomination buttons 351 for selecting a monetary denomination for a lottery ticket to purchase, an "ADD TO CART" button 352 for placing a lottery ticket into the shopping cart (reflected by meter 310), and a "BUY NOW" button 353 for bypassing the shopping cart process (immediately finalize sale of the lottery ticket). The game window includes a GUI region 355 displaying a pick field having additional indicia 357 that may be presented to the consumer before, during, or after confirmation of purchase of the lottery ticket. Game play actions (e.g., selection of one or more of the indicia 357) may cause an alteration of the outcome of the purchased lottery ticket, for example, by providing an increased award amount (or an increased top prize). Thus, in one embodiment, the consumer is prompted to provide a game play action indicating one of the indicia 357 from a pick field, and once revealed, a corresponding award value potentially alters the award amount of a lottery ticket that is printed on-demand.

Game play actions received from the consumer may include input garnered from any of a variety of input devices available to the consumer. Further, the input may be randomly determined, for example, if the consumer fails to provide timely input, consumer input is prohibited in a specific jurisdiction, customer input indicates random selection, etc. Game play actions may lead to alterations that are purely randomly based, at least partially skill-based, or are a result of express selection. For example, a consumer selecting specific symbols to match to randomly selected symbols may directly and accordingly alter the outcome of a lottery ticket. Game play actions may include direct consumer selection, determinations based on selections and/or a skill-based performance, or as a result of a random determination. Game play actions may be received in response to a wide variety of applications (e.g., modules 276) in a variety of contexts (modules 278). Game play actions input by a consumer may also incorporate the use of one or more input devices and a number of distinct inputs. In conjunction with one or more gaming events spanning over one or more games, a set of related lottery tickets can be collectively generated. Consumer game play actions and interactive gaming feature interaction via input devices, combined with randomly determined components to form an outcome for a lottery ticket provides a new and dynamic way to engage customers and deliver exciting lottery games and on-demand scratch lottery tickets where a customer is able to alter the outcome of the ticket.

In one embodiment, all alterations to the gaming outcome are beneficial to the consumer (e.g., increase the potential prize or award associated with the lottery ticket) in order to increase consumer anticipation and the sense of a possibility for larger prizes or enhanced chances of winning. For example, a game alteration may alter the probability of a lottery ticket achieving a winning outcome and receiving an associated award, provide an instant award, increase the pay table of winning combinations for the lottery ticket, increase the highest available prize for the lottery ticket, provide additional opportunities for winning combinations of symbols, provide chances for supplemental awards, etc. In another embodiments, the potential for one or more negative alterations may be mixed among potential beneficial alterations prior to an outcome being determined. The lottery game alteration(s) may be randomly determined, directly selected, or even purchased by the consumer at the time of purchase.

In one embodiment, a lower banner of the GUI 300 includes a language selection button 362, a ticket validation button 364, and a coupon redemption button 366. In response to consumer selection of button 362, 364, 366, a corresponding function will be performed. The language selection button 362 provides a way for a consumer to switch the language used with the GUI 300, the ticket validation button 364 initiates a process of checking a presented ticket for winning or non-winning status (e.g., using a bar code reader, scanner, ticket slot acceptor, or other input device for code entry), and the coupon redemption button 366 allows a consumer to input (or present) a code or voucher/coupon that may be redeemed for vending credits, cash, or both. In other embodiments, the displayed buttons may initiate other additional processes, one or more of the buttons may be omitted from the GUI 300 (or displayed only in response to a triggering event), and/or additional buttons may be presented that are not described herein. The modification of the GUI 300 may occur in a number of ways that do not impact the overall operation, spirit, or scope of the invention.

Referring to FIG. 5, the GUI 300 is shown with a differing highlighted selected indicia 340 that specifies a new gaming option selection made by the consumer and an updated corresponding game window 350. The game window 350 includes a GUI region 355 displaying a wheel indicia 358 that may be spun to randomly grant one or more alterations of the base lottery ticket game. For example, the wheel indicia 358 may provide random selection of one or more of an increased multiplier value for an award of the lottery ticket, an increased top award for the lottery ticket game, or consumer selection of one or more of "lucky numbers" used to determine whether an award is granted for the ticket. Additional options and other gaming variations of the game may also be used without departing from the intended spirit and scope of the invention. When completed, the consumer may be further prompted for game play input to actuate the wheel indicia 358 and reveal the determined alteration for the lottery game.

Referring to FIG. 6, the GUI 300 is shown with yet another differing highlighted selected indicia 340 that specifies another gaming option selection made by the consumer having a corresponding game window 350. The game window 350 includes a GUI region 355 having pick field indicia 359 that displays indicia selected by a consumer used as a component of the outcome for a printed lottery ticket. Thus, the consumer game play input selections become part of an outcome for a scratch lottery ticket that is generated on-demand by using the GUI 300. In one embodiment, the selections of the indicia 359 are combined with retrieved or randomly generated additional lottery ticket information to generate the outcome for the ticket.

Additional features may be available to consumers selecting higher denominations for the lottery ticket. For example, a consumer purchase for a $1 or $2 lottery ticket may allow consumer selection of three indicia 359, while a $10 lottery ticket allows for up to five. Other embodiments may include computer random selection of additional indicia. Further, customer loyalty status or points may be used to customize the lottery tickets and experience for the customer. Additional embodiments may include lottery games having fewer indicia 359 to match for lower denomination lottery tickets.

Figure 7:
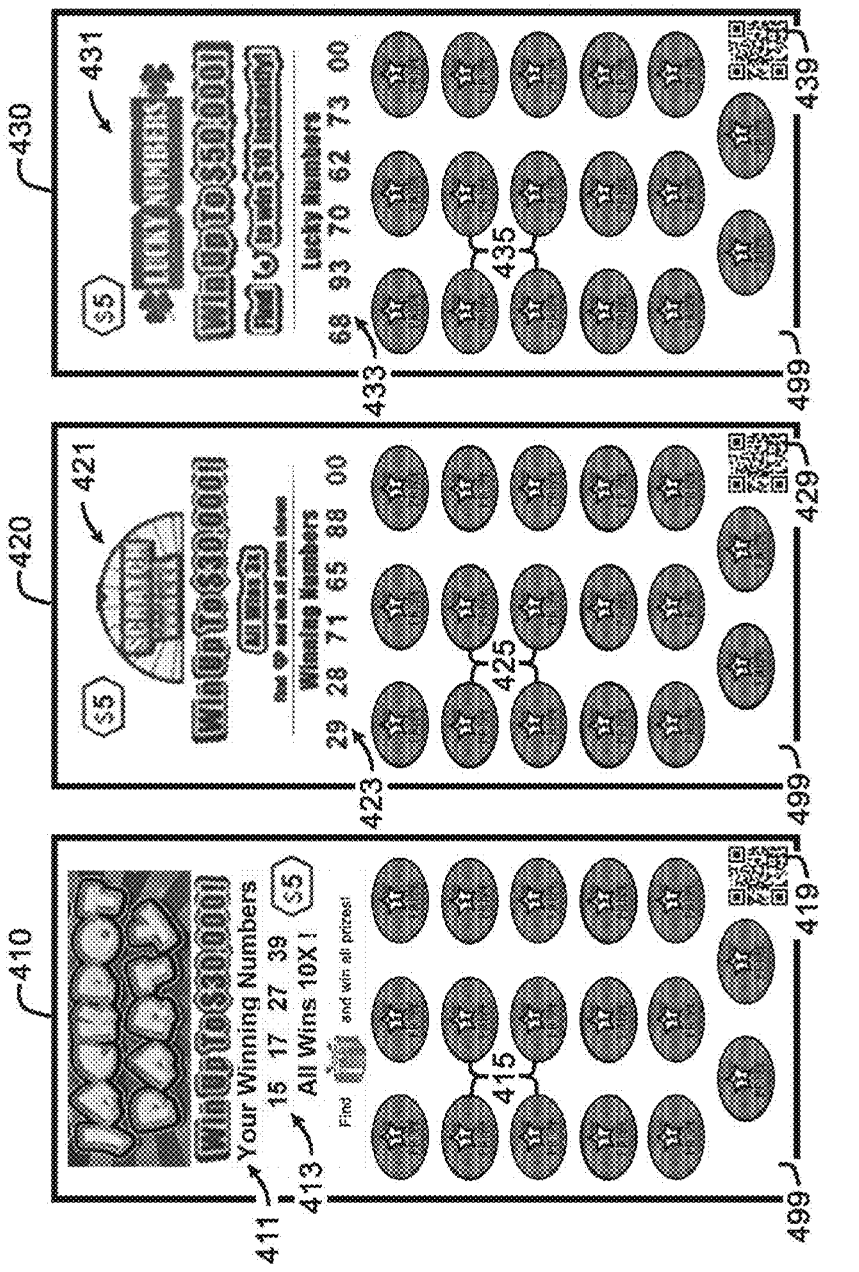
FIGS. 7-8 are images of exemplary on-demand lottery tickets generated by an on-demand lottery ticket system having hidden and non-hidden portions according to an embodiment of the present invention.

Referring now to FIG. 7, a set of exemplary sample on-demand printed lottery tickets 410, 420, 430 are shown in one embodiment. The tickets 410, 420, 430 as described herein comprise lottery ticket media 499 and are suitable for use with a thermal printer as described prior (e.g., printer 50 of kiosk 11). In other embodiments, other media types would be appropriate depending on the type of printers implemented.

Each segment of the lottery ticket media 499 may be perforated from adjacent ticket segments. The ticket media 499 comprises an exposed thermal media (defining a non-hidden portion 411, 421, 431) and a material cover (defining a hidden portion 415, 425, 435). The material cover may be inherently opaque in order to conceal printed information on the thermal ticket media 499 which it covers, or may comprise transparent or translucent material made opaque by printing information, game graphics, or other indicia generated during the printing process. The material cover may be removably attached to the ticket media using a thermally conductive adhesive such that a thermal printer is able to apply heat onto the underlying thermal lottery ticket media through the opaque material to print imagery. The material cover may be an opaque heat-conductive foil or other film that does not inhibit the transfer of heat by a thermal printer head to create imagery directly on the underlying surface of the lottery ticket media 499.

In one embodiment, the material cover may be detached from the thermal media using a coin or other "scratching" frictional device. A consumer is able to remove the material cover to reveal the game results printed underneath. If the ticket is a "winning ticket" (i.e., displays a winning combination or has a winning outcome), the consumer is able to redeem the ticket for an award amount. For example, redemption of a lottery ticket may occur at a kiosk 201 or other consumer service center.

The material cover does not shield the entire thermal media surface of the lottery tickets 410, 420, 430, so that a corresponding non-hidden portion 411, 421, 431 is exposed (not concealed by the opaque material). The non-hidden portion 411, 421, 431 may be used for printing game information (e.g., rules, pay table, etc.), game theme content (decorative images and fonts), and other indicia directly thereon. Thus, the tickets 410, 420, 430 have a respective non-hidden portion 411, 421, 431 that includes imagery generated by a printer on the lottery ticket media (e.g., by a printer 50 of a kiosk 11 on media 52) that is initially visible to the consumer upon ticket reception. In one embodiment, the hidden portion 415, 425, 435 of the lottery tickets 410, 420, 430 are defined by a set of one or more regions covered by the opaque material cover. It is noted that the tickets 410, 420, 430 are only illustrative and other arrangements of ticket printing formatting, as well as various types of utilized media, are equally suitable for use with the present invention.

In one embodiment, the respective non-hidden portion 411, 421, 431 of the lottery ticket 410, 420, 430 includes a set of symbols 413, 423, 433 indicating numbers used to partially determine an outcome for the lottery ticket based. An outcome may be based on the symbols revealed in each region of the respective non-hidden portion 411, 421, 431 and hidden portion 415, 425, 435. In other embodiments, non-number symbols may be used to generate outcomes for a lottery ticket. In one embodiment, each hidden portion 415, 425, 435 of the tickets 410, 420, 430 has an associated prize amount that may be impacted by other components of the outcome. For example, the cost of the lottery ticket (denomination), associated multiplier values (if present), instant awards, number of matching images, secondary criteria, etc., that are part of the outcome may alter the award amount of the lottery ticket.

In one embodiment, each region of the ticket 410, 420, 430 corresponding to the hidden portion 415, 425, 435 shields a particular symbol and associated prize, such that when a revealed symbol matches one of the symbols 413, 423, 433 of the respective ticket, a prize amount is awarded to the consumer upon redemption. As opposed to using numbers, the regions of the hidden portion 415, 425, 435 may alternatively display other symbols (e.g., fruit or cash amounts) that when matched to the symbols 413, 423, 433 grant specific awards.

A quick-response (QR) code 419, 429, 439 may also be printed in a hidden portion or non-hidden portion of the respective lottery ticket media 499. The QR code 419, 429, 439 may be used to quickly verify or authenticate the lottery ticket, determine any award associated therewith, derive transactional information associated with the ticket, etc. The QR code 419, 429, 439 may be specific to the ticket on which it is printed or be otherwise associated with a transaction in which the ticket was purchased. For example, a customer may insert the ticket 410 into a kiosk 201 to immediately determine an associated award for the ticket 410 and/or look up or regenerate information regarding the ticket 420 and the ticket 430. In one embodiment, a consumer loses ticket 420 and presents the ticket 410 a kiosk 201 to look up transactional information that includes the ticket 420. In one embodiment, for a nominal fee, the consumer may be able to re-print and/or re-play the ticket 420 based upon the transactional information.

Figure 8:
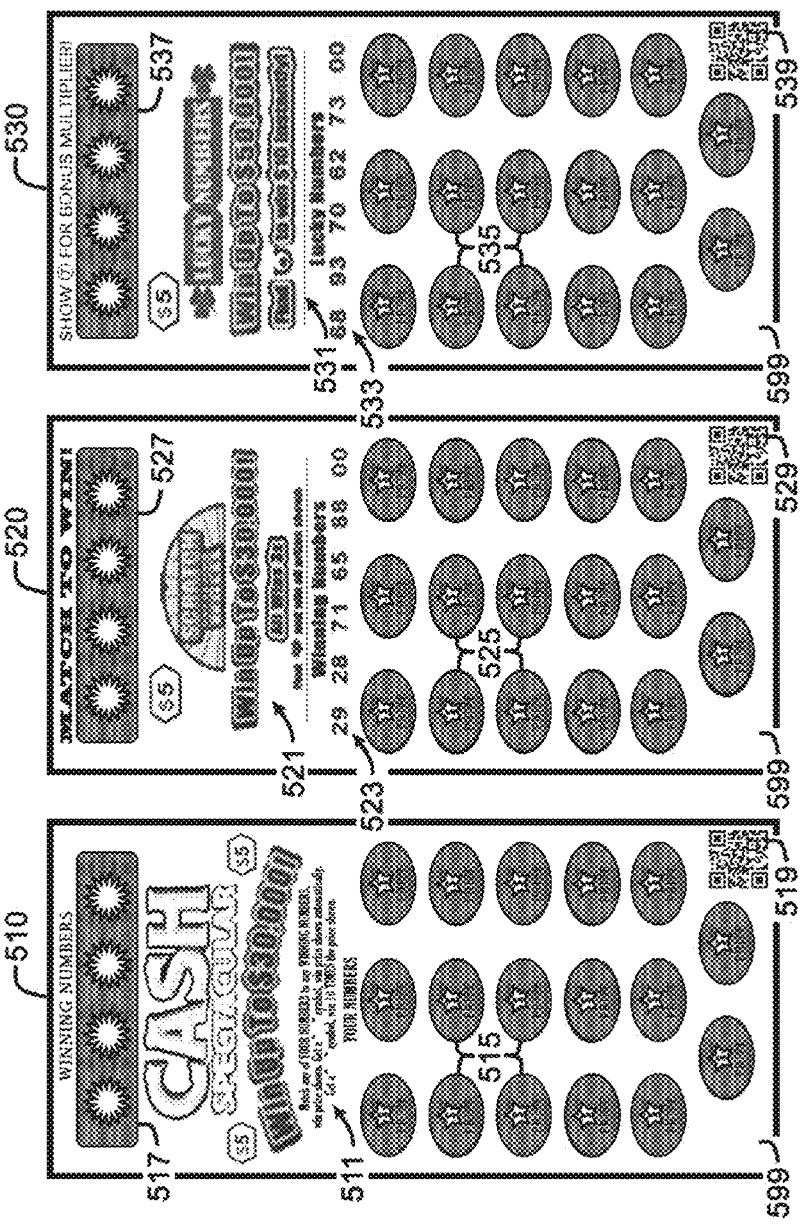

Referring now to FIG. 8, a set of exemplary sample on-demand lottery tickets 510, 520, 530 are shown in one embodiment. The tickets 510, 520, 530 include a respective non-hidden portion 511, 521, 531, set of outcome symbols 523, 533, hidden portion 515, 525, 535, and QR code 519, 529, 539, similar to the tickets 410, 420, 430. Tickets 510, 520, 530 also include an additional hidden portion 517, 527, 537 at the leading edge of the ticket media 599.

The additional hidden portion 517, 527, 537 provide another section on a respective lottery ticket to include symbols for the consumer to reveal. Referring to ticket 510, the additional hidden portion 517 reveals a set of symbols (when the opaque cover is removed) used to determine the outcome of the ticket 510 (e.g., by matching the revealed symbols 517 to the revealed symbols of hidden portion 515). The additional hidden portion 527 of the ticket 520 provides an additional set of symbols that may be matched to the symbols 523 to determine the outcome, thereby acting as an extension of the hidden portion 515. The hidden portion 537 of ticket 530 reveals symbols that may determine a bonus multiplier value that will proportionally increase the award amount of the ticket 530 accordingly. Other embodiments may use the hidden portion 517, 527, 537 of ticket 510, 520, 530 to generate other types of ticket outcomes.

It is noted that the format of the hidden portion 515, 525, 535 and the additional hidden portion 517, 527, 537 are consistent on the tickets 510, 520, 530. That is, the same layout for the hidden-portion 515, 525, 535 is used for each of the tickets 510, 520, 530 since the lottery ticket media 599 is identical even though the game play and outcome of the tickets 510, 520, 530 are very different. Through use of the non-hidden portion 511, 521, 531 to display graphical imagery relating to the game theme, specific rules of the game, and information used for determining the outcome (e.g., symbols 523, 533), printed lottery tickets generated on-demand may have a wide range of game mechanics, rules, themes, and layouts that may be selectively chosen and presented using the same lottery ticket media 599.

The ability for network communications and use of a thermal printer to simultaneously print imagery in both the non-hidden portion and hidden portion(s) of a generic lottery ticket media enables a system (such as the one described in FIG. 3) to fabricate customized lottery tickets on-demand. By using a defined format and layout, game theme specific imagery, and lottery ticket pool information lookup and retrieval, a generic lottery ticket media may be transformed into an authentic lottery scratch ticket for a particular lottery game dynamically at the time of purchase.

Further provisions for network communications enable the system to access one or more servers or databases storing information that can be used to customize the lottery tickets. Customization may include specific marketing information or local inventory management to enhance an on-demand printed lottery ticket with relevant or targeted awards and prizes. For example, if a casino network 288 maintains a server 279 that manages inventory, marketing, and promotions information, the additional hidden portion of a lottery ticket may include opportunities for a consumer to win prizes that are specifically selected and allocated by the casino for the lottery ticket games (e.g., distribution of tickets for entertainment events, surplus inventories, etc.). In one embodiment, if a casino wants to fill seats for an upcoming concert at a local entertainment venue that is known to have less-than-optimal attendance, the casino may include awarding promotional prizes using the hidden portion of on-demand printer lottery tickets in a controlled and predicable manner. Network communication between a kiosk 201 with a server 279 providing centralized access to ticket pools, interactive games, gaming themes, inventory management, etc., allows for easy allocation of a specific number of prizes via on-demand lottery tickets that may be printed at the facility during any designated time period. This includes use of any locally or remotely stored or derived information for providing focused marketing, promotional information dissemination, perishable inventory reduction, etc.

Further, the system provides a way to enable promotional or marketing specific information to potential consumers in real-time in addition to printing promotional or marketing information dynamically upon a lottery ticket. Further, promotional or marketing information may be presented in a hidden portion of the printed lottery ticket. Thus, not only can advertisements be displayed to a consumer directly by the kiosk 201, content may be inserted into one or more sections of the printed lottery ticket. Additionally, parameters collected from the consumer based on a desired complimentary offer may be used to determine one or more advertisements to be displayed to the consumer in the interface or on the ticket. Other information collected or known about the consumer (e.g., demographics information, behavioral data, etc.) may also be used to determine what advertisements or marketing should be performed and displayed and where presentation should occur. Such advertisements may also serve as financial support for an operator to generate revenue based on advertising performance and delivery. Advertisers may also target particular consumers and types of consumers in accordance with a particular game theme or event in a dynamic manner.

Further, the ability for one or more servers to maintain database records used for episodic on-demand instant tickets may be performed. In one embodiment, a first on-demand lottery ticket purchased and printed initiates creation of a corresponding record in one or more servers accessible to the kiosk 201 via one or more networks (e.g., server 270, server farm 274, server 279, etc.). As the lottery ticket is reintroduced (redeemed or presented) to a kiosk 201 (or another device capable of recognizing the ticket and accessing the suitable network entities), future lottery tickets may be generated with knowledge of the results of any previous related lottery ticket(s). Thus, records may maintain collections of symbols and/or other elements from ticket outcomes for a consumer (e.g., for collecting properties in a MONOPOLY™-based theme or suspects, weapons, or rooms in a CLUE™-based theme). Transaction and/or episodic information may be maintained in an ongoing process associated with the series of lottery tickets or only the last printed lottery ticket of a series. For example, each time a previously printed lottery ticket is presented/verified and a new lottery ticket is purchased, a consumer may be able to inspect a maintained recordation of all the lottery tickets, outcomes, and new or repeating episodic events spanning a series of lottery tickets purchased by the consumer. In one embodiment, five consecutive on-demand printed lottery tickets having a non-winning outcome automatically awards a new, free lottery ticket to the consumer when using a kiosk 201. A consumer may also be able to generate a single lottery ticket that merges the outcomes of a plurality of related lottery tickets such that the winnings of multiple tickets are combined into a current single ticket. Likewise, collections of items presented in the outcomes spanning multiple tickets may be accounted, or a consecutive series of tickets may be joined into a chain of lottery tickets that are maintained as a single ticket. In one embodiment, transactional identification may be used to track prior on-demand lottery ticket generation and track lottery ticket outcomes that span numerous lottery tickets and even numerous gaming themes. Database records maintained in any network entity (e.g., kiosk 201, computer 210, server 270, 274, 279, etc.) may be used to maintain and provide information used to generate on-demand lottery ticket outcomes and/or store information directly related to the generation of on-demand lottery tickets.

Figure 9:
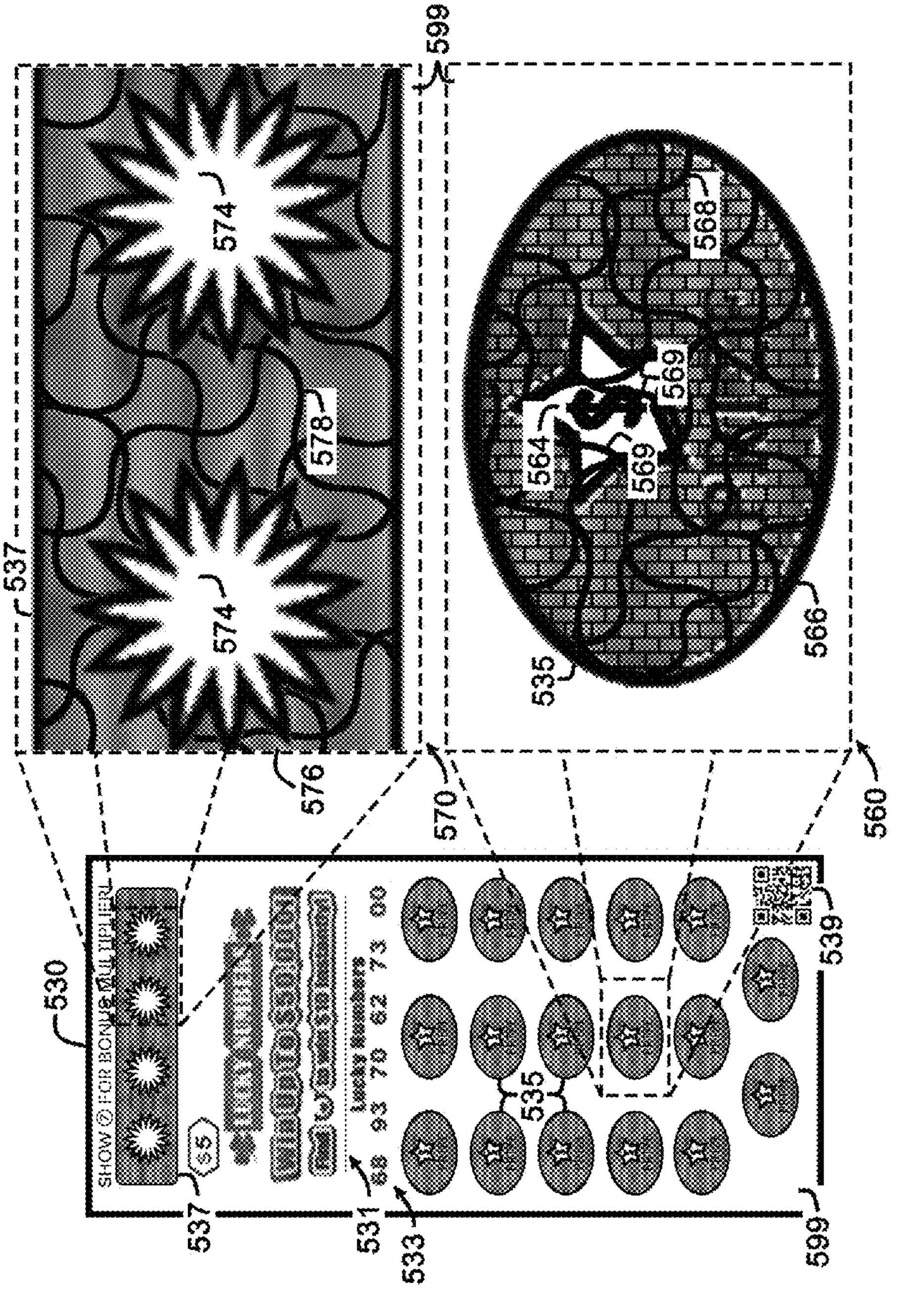
FIG. 9 is an enlarged view of two sections of a hidden portion of an exemplary on-demand lottery ticket according to an embodiment of the present invention.

Referring to FIG. 9, a lottery ticket 530 printed on ticket media 599 is shown with a close-up view of a region of the hidden portion 535 and the additional hidden portion 537 in one embodiment.

A magnified view of a region 560 is shown enhancing the view of a single removable section of the hidden portion 535 of the ticket 530. The region 560 includes an island of opaque material cover 566 applied to the underlying lottery ticket media 599. An additional opaque decal 564 is applied to the material cover 566. In one embodiment, a stamping, roller, or pressing device applies force to the lottery ticket media 599 to fracture or score the material cover 566 along with any additional decal 564. The fracturing process creates grooves 568 in the material cover 566 and grooves 569 in the decal 564. The grooves 568, 569 serve to allow partial sections of the material cover 566 to be detached from the media 599 without removal of the entire island. The fracturing of the opaque material helps mimic film removal behavior of traditional scratch lottery tickets.

In one embodiment, the material cover 566 has a pattern imprinted thereon that helps mask any images printed on the underlying media 599. That is, the material cover 566 may include one or more designs to obscure markings a printer head may create during a printing process. The material cover 566 is shown having a mesh of small tiling rectangles adding to the opacity of the island and obscuring the imagery printed on the media 599 underneath.

In one embodiment, the lottery ticket media 599 is generated by taking thermal paper and applying one or more layers of the opaque material cover 566 using a thermally conductive adhesive to allow a thermal printer to conduct heat through the cover 566 in order to print images on the underlying thermal paper. An additional decal 564 may be applied to the material cover 566 using a similar process. The fracturing of the decal 564 and the material cover 566 resident on the media 599 takes place using a pressing or rolling/cutting mechanism. Next, the unnecessary portions of the opaque material cover are removed (the section corresponding to any non-hidden portion 531), leaving behind the one or more islands of material cover 566 defining the hidden portion 535, 537 of the ticket 530. This blank lottery ticket media 599 is used by a printer to generate the lottery ticket 530 as described prior.

The region 570 shows an opaque material cover 576 applied to the media 599 which is then fractured forming grooves 578 using one or more of the methods outlined above. A decal 574 may be applied to the fractured material cover 576 such that each decal 574 does not have grooves. In some cases, this may improve the overall aesthetics of the hidden portion 535, 537 of the ticket 530. The fracturing of the opaque material 566, 576 on the ticket 530 may be constrained to one of these methods or be a combination of the two, as shown.

Figure 10:
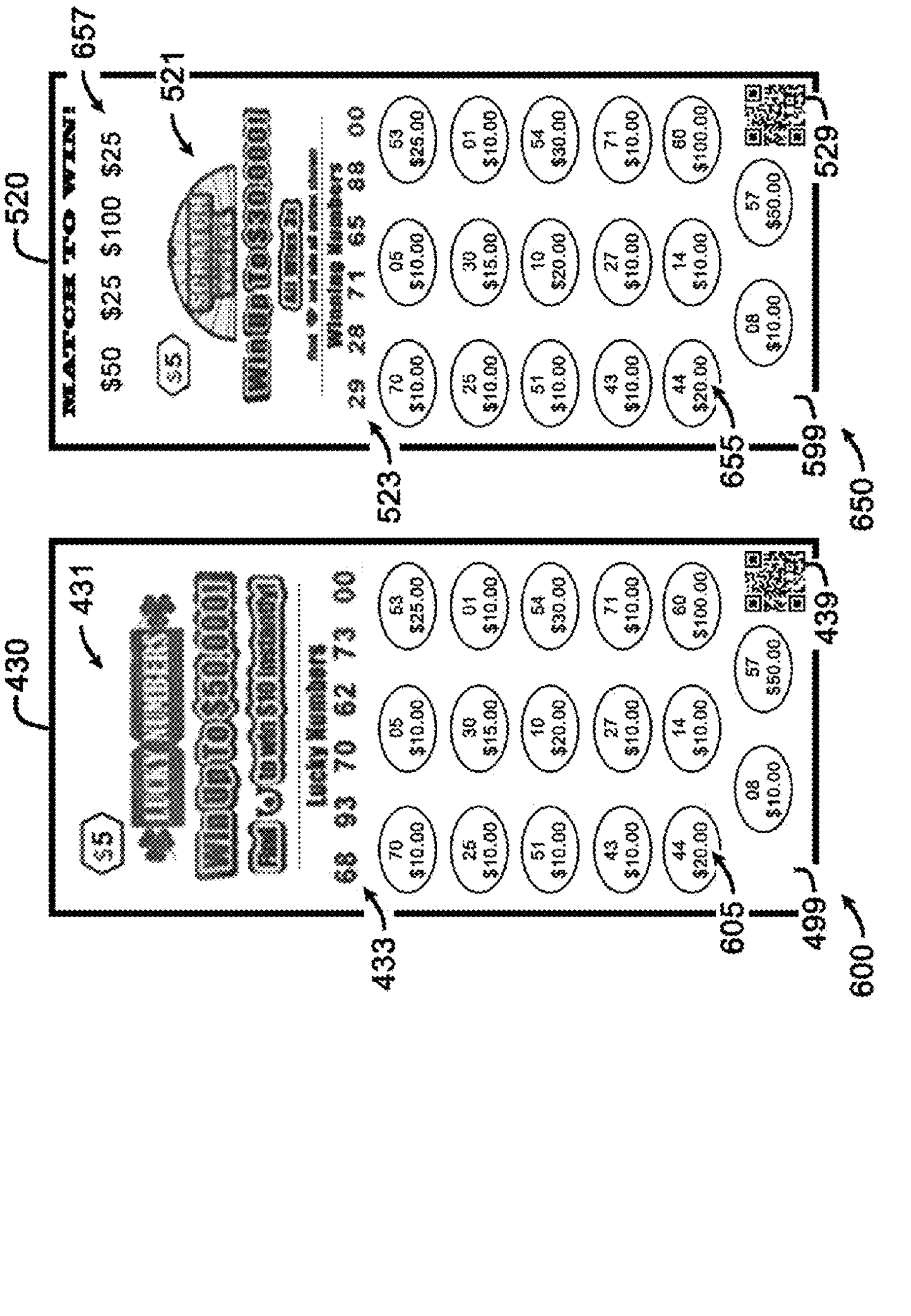
FIG. 10 is an image of exemplary on-demand lottery tickets revealing the imagery of the lottery ticket media beneath the hidden and non-hidden portions of the tickets according to an embodiment of the present invention.

Referring now to FIG. 10, the lottery tickets 430, 520 are shown as revealed tickets 600, 650, respectively, having all opaque material covers and decals removed from the lottery ticket media 499, 599. FIG. 10 is representative of the imagery that a printer (e.g., printer 50) imparts to the blank underlying thermal paper media 499, 599 of the tickets 430, 520.

The revealed ticket 600 shows the image 605 printed in region of the hidden portion 435 (now revealed, no longer hidden) of the ticket 430 shown in FIG. 7. Each of the previous cover islands of the ticket 430 corresponding to regions of the hidden portion 435 now reveal an image 605 having a symbol (e.g., a number) used to compare against the symbols 433 to determine an outcome for the ticket 430. If a symbol in an image 605 and one or more symbols 433 match, an associated prize (indicated by image 605) is awarded. Thus, the lottery ticket 430 as shown has seventeen independent chances to match a winning number and collect a corresponding award. The outcome of the ticket 430 is a combination of the outcomes of each independent matching possibility. It is possible that the "lucky numbers" symbols (e.g., numbers available to match) and the islands symbols (e.g., numbers available to be matched) may have more or less symbols than those shown in the diagram. Further, duplicates of symbols (and/or numbers) may be present in the groups of symbols to match or be matched. Thus, it is possible for every symbol 605 displayed on ticket 430 to match one or more of the symbols 433. Inspection of the ticket 600 reveals a single winning combination (most upper left island symbol) reflecting an award value of $10 for that match. In the event that the ticket 600 reveals no matching symbols, the ticket 600 would have no corresponding value upon redemption. The scanning of code 439 at a kiosk 201 or other consumer service terminal (e.g., a retail point-of-sale) can verify that the ticket 600 has an intrinsic value, and may be additionally eligible for one or more "second chance" events or drawings, as are known in the art, regardless of other awards.

The revealed ticket 650 shows an image 655 printed in one region of the previously hidden portion 525 (now revealed, no longer hidden) of the ticket 520 shown in FIG. 8. The ticket 650 now reveals the image 655 having a symbol (i.e., number) used to compare against the symbols 523 to determine an outcome of the ticket 520. Further, the image 657 corresponding to the hidden portion 527 of ticket 520 reveals an image displaying a set of prize amounts. In accordance with the rules for the ticket 520, in response to two or more prize amounts of image 657 matching, a prize of that amount is awarded. Thus, since two $25 prizes are revealed, the ticket 650 has an associated $25 award from this portion of the lottery game.

It should be noted that the non-hidden portion 521 of the ticket 520 uses similar imagery to the non-hidden portion 421 of ticket 420. Images printed to the lottery tickets may be compressed, reformatted, or replaced as necessitated by different layouts of the lottery ticket media and the corresponding hidden portion thereon. For example, the ticket 520 may display the top section of the non-hidden portion 421 of ticket 420 in a scaled or compressed manner, compensating for the printing of images for the additional non-hidden portion 527.

Figure 11:
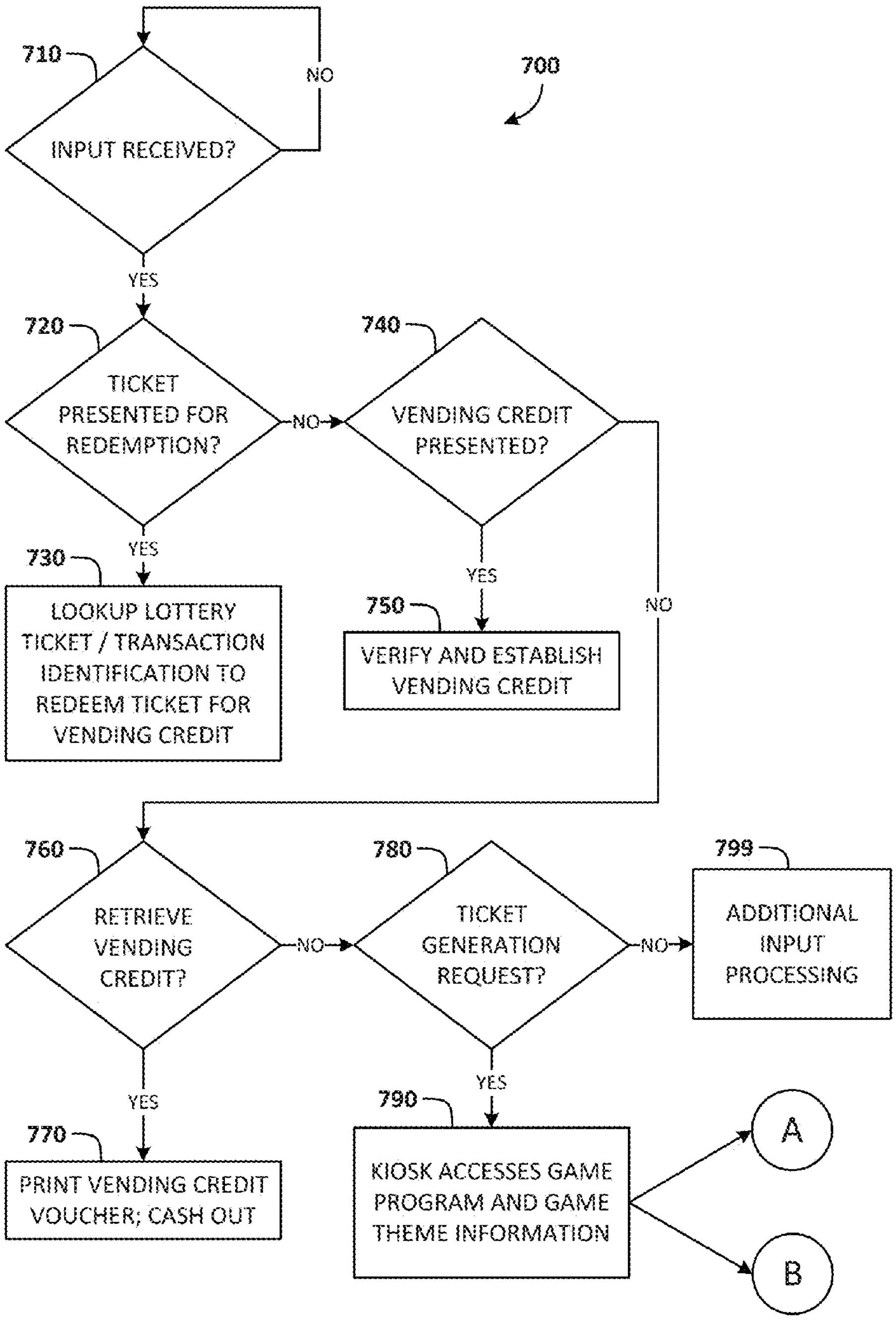
FIG. 11 is a flowchart illustrating a computer-implemented process conducted by a consumer terminal interacting with a consumer to facilitate various on-demand ticket vending functions according to an embodiment of the present invention.

Referring now to FIG. 11, a generalized operating process 700 details an algorithm performed by electronic equipment for interpreting and responding to consumer input with the lottery system in one embodiment. The process 700 may be performed collectively by a number of distributed electronic devices or be performed by a single computing device (e.g., a kiosk 201) as described below.

Referring to step 710, the kiosk 201 is put into an operational state waiting for consumer input. Consumer input may include one or more of a consumer inserting or presenting a lottery ticket or printed voucher to a suitable reader in the kiosk 201, the presentation of a physical item with an associated vending credit value (e.g., a bill, coin, or account-linked card or token), or interaction of the consumer with buttons or GUI elements of the kiosk 201 (e.g., a touch screen). Consumer input may take any of a variety of forms using any one or more of input methods detailed prior. In response to receiving consumer input, flow continues to step 720.

Referring to step 720, a determination is made as to whether the consumer input received in step 710 relates to a previously obtained lottery ticket that is being presented to the kiosk 201 for redemption. A consumer may present a ticket by scanning a code on the ticket using a barcode or QR code scanner, insert the ticket into a reader or accepting slot for subsequent scanning, or enter a ticket identifier, transaction identifier, or other identification used to uniquely identify the ticket being redeemed, potentially as one of a series of transactions or related tickets. As a result, the kiosk 201 may access one or more local or remote databases to determine whether an outcome and/or associated award for the ticket is specified therein. An exchange of messages may occur between the kiosk 201 and other system components (e.g., server 270, 279) to authenticate one or more portions of the ticket to ensure the ticket is not fraudulent or forged. Other methods of authentication may also occur that involve multiple steps and/or involve multiple network entities.

Referring to step 730, when it is determined that the consumer input comprises a valid ticket (or ticket identification) presented for redemption, a verification process beings to identify the associated value for the presented ticket. In one embodiment, a QR code is obtained from the ticket that uniquely identifies the presented ticket, a database lookup occurs over a network to a remote trusted server mapping the QR code to transactional identification information, the transactional identification information is used to determine an associated vending credit for the ticket (or set of tickets) via one or more databases using the network, an appropriate vending credit is reported to the consumer and reflected in a meter or consumer account, and the transactional identification is updated to reflect ticket redemption has occurred. A skilled artisan will recognize other embodiments may include additional steps or processes not expressly recited herein.

Additionally, transactional identification information may be used to conduct episodic lottery ticket games and additional outcomes as outlined above. In one embodiment, presentation of a lottery ticket provides information enabling the system to determine a set of tickets, outcomes, and associated attributes that may be used to impact future lottery tickets and/or awards. In one embodiment, a back-end ticket management system (e.g., server 270, 274, 279) may be used to provide information stored in a database (e.g., database 271, 272, 275, 277) regarding a lottery game that spans multiple lottery tickets. In one embodiment, a persistent game may require the purchase of additional lottery tickets. As new lottery tickets are generated and printed, a persistent and recurring game may be simultaneously performed that spans some or all of the entirety of the related thread of lottery tickets that are part of an ongoing transaction. Any corresponding awards or prizes gained from an episodic game of this type may be deferred, awarded immediately, restricted to additional tickets only or vouchers for physical redemption, etc. For example, in one embodiment, each purchased lottery ticket without a non-zero award is recorded in an ongoing tally corresponding to increasing secondary awards. A consumer may be given an option to redeem the lottery ticket for a corresponding secondary award in addition to a primary award or defer redemption of the secondary award to a later time.

The process of lottery ticket redemption described in step 730 may encompass any known process or criteria for lottery ticket verification, authentication, and redemption as known in the art, and should not be held as limiting. The exchange of requests and information between the kiosk 201 and one or more network entities may be required to complete this process. Once completed, any vending credits are awarded and transferred to the consumer via one or more methods, e.g., through the kiosk 201, to a corresponding consumer account, etc.

Referring to step 740, a determination is made as to whether the received consumer input relates to a presentation of media for increasing vending credit or other indication that vending credit is intended to be transferred to the kiosk 201 or other associated account. Examples include the insertion of bills, coins, or tokens into a bill, coin, or token acceptor, presentation of a voucher or item having an associated vending credit value, or account identification information uniquely identifying one or more accounts for linking to the kiosk 201 for credit exchange.

Account information may be stored locally or remotely from the kiosk 201 and involve one or more network entities to verify and authenticate proper account identification and access. Any number of authentication methods may be required to permit the consumer and/or the kiosk 201 to retrieve associated information for a particular account or access method that do not depart from the spirit and scope of the present invention.

Referring to step 750, in response to an identification of a vending credit media, the media is verified (e.g., by a bill validator, coin acceptor, scanner, or ticket reader) and an associated vending credit is accorded to the kiosk 201 for the consumer to use (e.g., for cashing out or purchasing lottery tickets). Alternatively, a consumer may be prompted for authentication information (e.g., password, PIN, biometrics, etc.) to initiate and/or complete a transaction of fund exchange to the kiosk 201. Other vending credit transfers may also occur, provided the consumer, account(s), and funds are properly identified, authenticated, and verified without departing from the spirit or scope of the invention. For example, a portion of the presented vending credit may be transferred to another (remotely controlled) account, while the remainder is made available for lottery ticket purchases via the kiosk 201.

Referring to step 760, a determination is made as to whether the received input relates to the consumer requesting retrieval of vending credit. For example, this may include a "cash out" consumer input via physical button actuation or GUI selection or an indication that funds from the kiosk 201 are intended to be transferred to one or more other accounts. As above, additional proper security measures may be performed prior to permission to perform such activities to ensure verification and authentication of the consumer, accounts, and any access requests made via the kiosk 201 or other device.

Referring to step 770, in response to the consumer input indicating vending credit retrieval, a cash out process is conducted. In one embodiment, a cash out process may include some or all of the available vending credit being transferred to a voucher, printed ticket, electronic medium (magnetic or solid state), or other credit bearing media. In another embodiment, a secured transaction may occur that transfers credit value of the kiosk to one or more other accounts. In one embodiment, in response to the cash out process being initiated, the kiosk 201 and/or system 200 cancels all in-process lottery-based transactions associated with the consumer that have not been finalized or completed. Again, a partial vending credit funds transfer may occur that leaves suitable vending credit available for operation of the kiosk 201, e.g., for purchasing lottery tickets.

In other embodiments, a persistent gaming state may be stored such that the consumer can pick-up where they left off upon reintroduction of a printed voucher or lottery ticket at a kiosk 201, including available vending credits. Thus, a lottery ticket can keep a record of an ongoing series of lottery tickets, purchase transactions, events, and meta data for use in secondary games like "collection"-type games, secondary games, or second-chance games. The maintenance of records relating to lottery-ticket games having episodic events and outcomes provides a wide array of potentially exciting and engaging lottery ticket gaming experiences.

As an example, a consumer may purchase one or more on-demand printed lottery tickets in a MONOPOLY™-themed lottery game. Each lottery ticket purchased provides a standard scratch-ticket experience in addition to an additional hidden portion revealing an image correlating to a single space of the MONOPOLY™ board. An image may represent a property name/location, an instant award (e.g., CHANCE, COMMUNITY CHEST, FREE PARKING, etc.), and perhaps an accompanying prize award in the event a triggering condition be achieved. As the consumer purchases additional lottery tickets for a game of this type, multiple MONOPOLY™ properties may be collected with subsequent tickets providing additional opportunities for completing property sets. Upon the completion of revealing a set of clustered properties (i.e., a set of properties indicating a monopoly), a revealed prize is awarded to the consumer upon ticket redemption. Thus, one or more ongoing, persistent games may be simultaneously conducted spanning many individual lottery tickets having independent outcomes. In one embodiment, a record of the past outcomes for the associated lottery tickets and the persistent game associated with the lottery ticket is included on each ticket as it is printed on-demand. Previous outcomes may be directly printed on each newly printed lottery ticket, be presented in a summary, or be made available to a consumer by accessing a dedicated website or using a QR code (e.g., via a browser, smartphone application, etc.).

In one embodiment, as a consumer presents a persistent game lottery ticket for redemption at a kiosk 201, the kiosk 201 remotely accesses one or more servers 270, 274, 279, and/or databases 271, 275, 277, to retrieve associated ticket or transactional information for the persistent game (and all tickets associated therewith). The ticket or transactional information may be used to specify outcomes for prior episodic tickets (e.g., by printing/displaying prior outcomes), generate outcomes for newly on-demand printed lottery tickets (e.g., when purchased), and/or specify a vending credit value for the lottery ticket as presented. The persistent storage of ticket and/or transactional information may continue indefinitely (tracking all purchased and played ticket outcomes), or continue until a suitable winning event occurs or a maximum limit of tickets are purchased or redeemed.

In one embodiment, in response to the consumer initiating a cash out process in step 770, the resulting printed voucher or ticket may be associated with persistent information that is printed directly upon the ticket, voucher, or other media as received by the consumer. The information may be stored and/or retrieved using ticket information, transaction information, or other information via one or more local or remote databases via an internal bus and/or external network, requiring any level of suitable authentication and verification.

Referring to step 780, a determination is made as to whether the received consumer input relates to a request for specifying, selecting, generating, or purchasing one or more on-demand instant scratch tickets using the kiosk 201. If not, any remaining additional input processing may occur in step 799, for example, use of the kiosk 201 to browse the available selection of games and tickets. Otherwise, the consumer is given options to generate and print the lottery ticket on-demand in accordance with the specific embodiment being employed.

Referring to step 790, the game theme information is accessed (and/or remotely retrieved and copied, if required) for display on one or more display devices of the kiosk 201. For example, imagery for display in one or more game windows 350 may be accessed or dynamically generated prior to display to the consumer. Additional programmatic instructions may also be provided that defines the way the kiosk reacts to consumer selection of a particular ticket menu option.

Specifics of the particular embodiment including operation and communication of the kiosk and the various components of the system are now performed in accordance with the selected input. In the following examples, two such embodiments are described, generation of tickets having purely pre-determined lottery game outcomes (e.g., Class II), and generation of tickets having an associated random element (e.g., using a RNG call). A skilled artisan will recognize that other embodiments may include or omit one or more steps of the following algorithms during routine operation. The retrieval and/or generation of information defining the outcome of the ticket is necessary prior to lottery ticket generation and printing. Particular lottery ticket information may include remote or local database lookups based on sequential access, random or pseudo-random number generation for part or all of a ticket outcome, and may include consumer interaction to alter or determine the outcome for the resulting on-demand lottery ticket.

Figure 12:
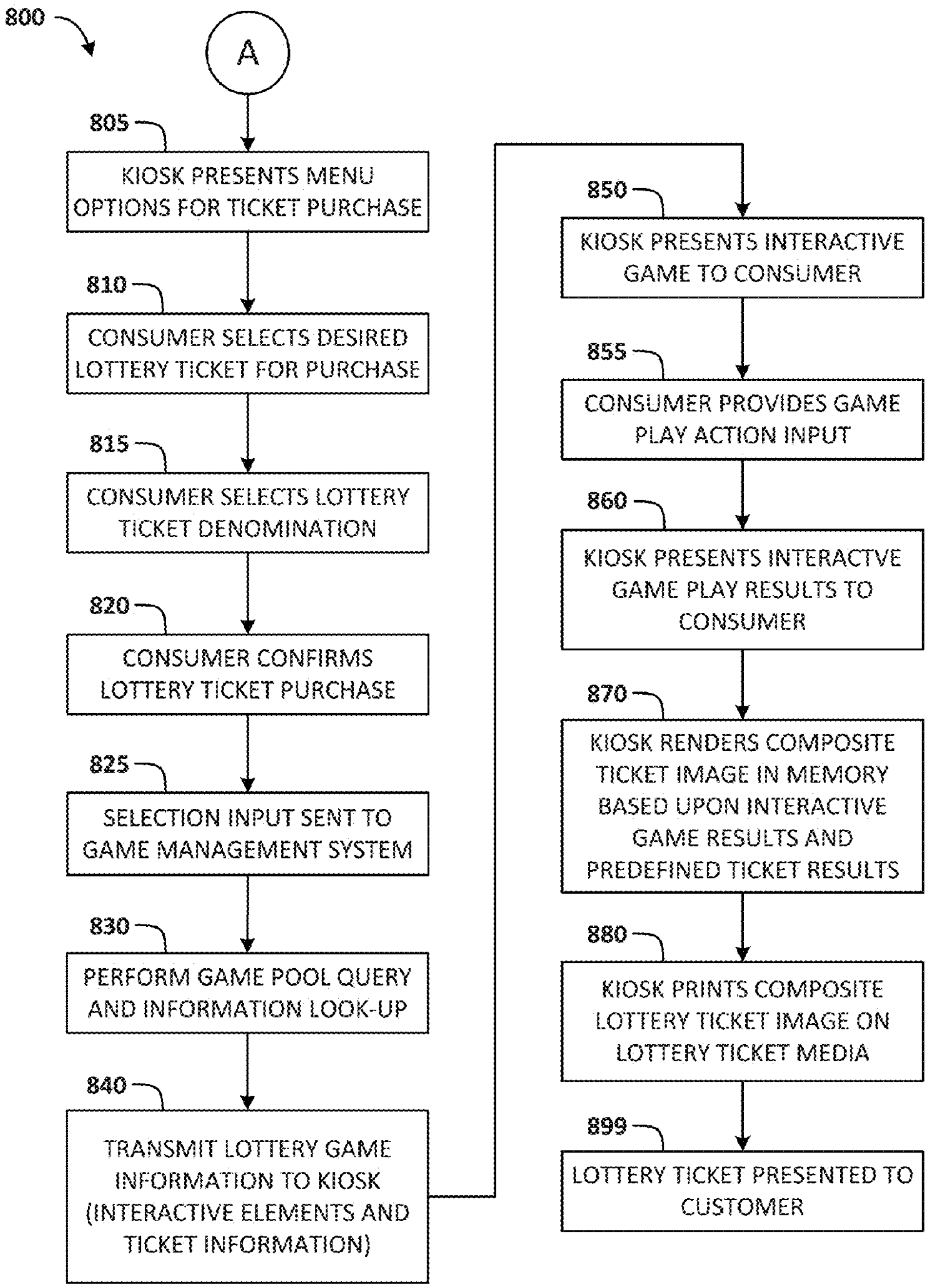
FIG. 12 is a flowchart illustrating a computer-implemented process performed by a lottery system generating on-demand lottery tickets with predetermined outcomes according to an embodiment of the present invention.
Figure 13:
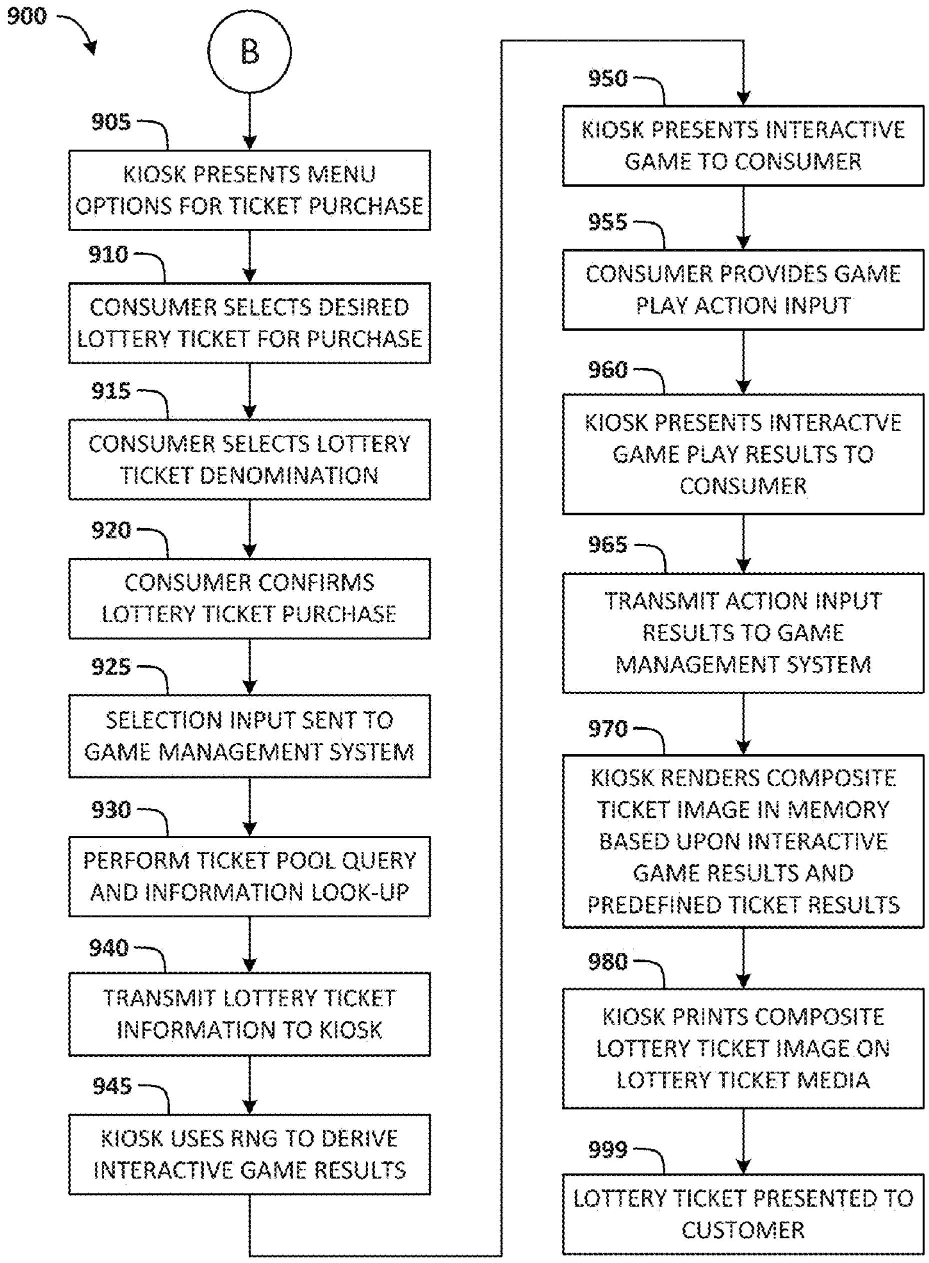
FIG. 13 is a flowchart illustrating a computer-implemented process performed by a lottery system generating on-demand lottery tickets with ticket outcomes that are altered by randomization and/or user play action inputs according to an embodiment of the present invention.

There are two differing embodiments shown separately, wherein a lottery ticket is generated as selected from a pool of predetermined ticket outcomes in FIG. 12, and generating or accessing one or more random numbers used to determine part or all of an outcome for a lottery ticket in FIG. 13. A skilled artisan will recognize modifications of these two embodiments that do not depart from the overall scope and spirit of the invention as described.

Referring to FIG. 12, a computer implemented process 800 is described for the operation of a kiosk 201 and other components of the lottery system 200 in one embodiment. The embodiment shown in FIG. 12 uses a network-accessible, back-end ticket game management system (e.g., server 270, 274, 279, etc.) to provide predetermined outcomes for on-demand printed lottery tickets. Ticket game theme and lottery ticket image information may come from the same server or another network entity managing such resources. The process 800 may print lottery tickets that conform to the requirements for Class II gaming under the Indian Gaming Regulatory Act. In some cases, the ticket purchase experience, consumer interaction, and/or outcome presentation may be greatly varied while the lottery ticket outcome as specified in received ticket information is not altered. In one embodiment, the consumer interacts with a point-of-sale terminal (e.g., kiosk 201) to participate an interactive gaming feature which does not alter the printed lottery ticket outcome.

Referring to step 805, a consumer terminal (e.g., kiosk 201) presents a menu of options for facilitating on-demand lottery ticket selection and purchase. One such menu of options may be seen in each of FIGS. 4-6. A wide variety of other presentations and/or user interfaces may be employed to help a consumer inspect lottery products they may be interested in purchasing and interactive games they wish to participate in.

Referring to step 810, a consumer selects one or more menu options that specify a desired on-demand lottery ticket for purchase and printing, e.g., selecting one or more indicia 330. In response to the selection of a particular type of lottery ticket for purchase, the kiosk 201 may present the consumer with an additional set of menu options particular to that lottery ticket game. The details of the menu, available options, and overall look and feel of the GUI (e.g., GUI 300) may be loaded or retrieved in response to the selection, for example, from one or more remote sources on a network 282, 288.

Referring to step 815, a consumer is prompted to select ticket-specific attributes for the ticket(s) being purchased. In one embodiment, a consumer may be prompted to select attributes that are required for the purchased ticket(s). For example, a consumer may be asked to specify one or more of a ticket denomination and a number of tickets to be purchased. Other consumer selections may include a jurisdiction for the lottery ticket. When multiple gaming themes are offered for the same lottery game, the selection of a particular theme or imagery for the ticket may be available. Any other desired or required additional information related to the tickets being purchased are received from the consumer at this point.

Referring to step 820, a consumer confirmation of the lottery ticket purchase takes place. For example, the consumer may select an “Add to Cart” button 352 or a “Buy Now” button 353 to finalize the ticket purchase. Once the ticket purchase is confirmed by the consumer, a vending balance may be altered in accordance with the purchase. Other functions may occur that are necessary to complete the transaction, for example, consumer identification (e.g., to receive loyalty points or verify proper age authentication), redemption of loyalty points or assigned awards to obtain tickets, transfer of funds from one or more accounts to the vending credit amount, etc.

Referring to step 825, in response to the consumer confirming the purchase of a lottery ticket, a process is conducted to determine the outcome for the ticket. In one embodiment, the information related to the consumer selection and specified lottery ticket attributes are transmitted to one or more network-accessible computing machines that act as a back-end game and ticket management system (e.g., server 270, 274, 279, etc.). In one embodiment, a request is made on behalf of the consumer terminal (e.g., kiosk 201) to participate in a specified lottery game having ticketed entries by receiving ticket generation information from the ticket management system. In one embodiment, the ticket management system provides information used to specify and/or deterministically derive outcome portions for the lottery ticket and generate the imagery used to ultimately print the lottery ticket on-demand at the kiosk 201 or printer 250. In one embodiment, the consumer selection information may include additional information that is not selected by the consumer, for example, one or more of a consumer identification number, a session identification value, a kiosk identifier, an assigned name for a selected game, a kiosk and/or consumer status indicator, a seed value for ticket or pool selection, a current date/time combination indication, etc.

Referring to step 830, a look-up process is performed by the ticket management system to determine the ticket information for delivery to the consumer terminal for ticket rendering. For example, the ticket management system may perform a query of a database of table, optionally using an ordered value, seed value, or other randomized process or algorithm, determine and assemble the details (outcome and/or image) for the generated ticket, and deliver the ticket information. In one embodiment, a game pool ticket database is used to lookup an outcome and associated rendering image information for the lottery game and ticket. The ticket management system may sequentially determine the outcome for the ticket or use one or more random or pseudo-random numbers to select one ticket outcome from a set of available ticket outcomes present in the pool. The ticket management system processes all received information to determine the ticket information for delivery to the consumer terminal.

In one embodiment, an input value is provided and used for a predefined deterministic function that may include use of a pseudo random number generator. In response, a deterministic function may produce an output value used to retrieve a particular ticket outcome from a ticket pool or prize matrix for inclusion in the ticket information. In some embodiments, multiple ticket pools and/or prize matrices may be defined and additional information (e.g., either included in the consumer selection input information or determined by the ticket management system) may be used to derive a ticket outcome and the associated ticket information.

Referring to step 840, the ticket information for each lottery ticket is determined/generated, assembled, and transmitted to the consumer terminal for rendering. In one embodiment, the ticket information includes an indication of the hidden and non-hidden portions of the printed lottery ticket. Additionally, the ticket information may include an indication of revealed symbols, prizes, multipliers, outcome modifiers, etc., that are revealed as part of an interactive game associated with the ticket purchase. The ticket information may optionally include additional information about one or more of the consumer, the lottery game, prior or current transactions, the requesting client, marketing or advertisement content, or other information. The ticket information may also include information that is not related to the ticket or the outcome, e.g., promotional or aesthetic content presented to the consumer via an interface (e.g., GUI 300).

Thus, in response to a request being processed by a ticket management system server, a ticket may be generated on-demand using assembled ticket information transmitted to a client computing device. In some examples, the ticket information includes imagery of a complete ticket representation presented as part of an electronic display or directly printed onto lottery ticket media. In other examples, the ticket information includes data enabling a system to assemble or derive all the visual components required to create a ticket image and print the ticket on-demand. A dedicated ticket management and ticket image generation system server may create an image-based lottery ticket representation and transmit the ticket representation as part of the ticket information to a kiosk or a printer for processing. In some embodiments, the transmission of the ticket representation or the transmission of ticket information enables a physical lottery ticket to be printed on-demand having a consumer verifiable outcome for the lottery ticket. In other embodiments, the ticket information includes a unique identifier associated with a particular ticket outcome that is transmitted to a requesting client. In one embodiment, the unique identifier may be used by a network client to retrieve a ticket outcome and/or associated image data from one or more remote systems to generate a lottery ticket on-demand.

A remote network ticket management server (e.g., server 270, 274) may be configured to provide ticket representations and/or ticket generation information to a local casino server (e.g., server 279) for distribution to locally connected clients (e.g., kiosks 201 connected to the network 288). In some examples, a casino server 279 interprets received ticket information to permit display of ticket representations on connected kiosks 201. In some embodiments, the casino server 279 passes ticket generation information to the kiosk 201 which interprets the ticket generation information for subsequent display via a GUI 300. In one embodiment, the kiosk 201 includes a printer 50 for generating a physical ticket in response to either a ticket representation or ticket information, as detailed prior.

In one embodiment, a ticket outcome included in the ticket information may be dependent upon redemption of one or more prior lottery tickets. In this case, a prior lottery ticket must be scanned or otherwise presented in order for a consumer to participate in an ongoing episodic lottery game instance. The resulting generated ticket information may include transactional information or other identifying information used to modify the ticket information such that persistent information may be maintained within a series of lottery tickets.

That is, the ticket information may include consumer identification and/or transactional information associated with a series of tickets previously purchased for a particular lottery game. In one embodiment, as a ticket is presented to a kiosk 201, one or more remote network servers may be accessed for transactional information associated with an identified consumer or ticket. Using transactional information, generated ticket information may specify related prior transactions and/or lottery tickets. In this way, a series of predetermined lottery ticket outcomes may be associated with a single physical lottery ticket, having a cumulative effect. As new ticket information is generated and used to generate new lottery tickets printed on-demand, a series of ticket information records may be correlated and maintained in an account-based database accessible via local or remote communication.

Further, the ticket information may include additional information received from a third-party, promotional, casino management, loyalty, additional gaming, or other type of server accessible on the network that may include, embed, or reference information into the ticket information. For example, additional connectivity between promotional servers, casino management serves, and loyalty point servers may enable ticket information to include codes that permit access to restricted casino areas or other gaming/gambling environments, and/or additional available games.

Referring to step 850, an interactive game or gaming feature may be presented to the consumer on the client terminal. In one embodiment, a GUI 300 is presented in one or more displays of a kiosk 201. The GUI 300 and/or interactive game may be expressly specified (by code or reference) as part of the ticket information received by the consumer client terminal. Referring back to FIG. 4, an indication of the prize amount for a consumer selected one of the indicia 357 may also be specified and delivered to the kiosk 201 as part of the ticket information. The predetermined prize amount may result from consumer selection of any of the indicia 357, removing all randomization while giving the appearance of random behavior. Likewise, referring back to FIG. 5, a result for the spinning wheel 358 may be part of the ticket information, used to generate animation to display the corresponding outcome. Referring back to FIG. 6, a set of predetermined lucky numbers may be specified in the ticket information. In each of these cases, the outcome of the interactive game and resulting printed lottery ticket may be completely predetermined as dictated by the ticket information delivered to the kiosk 201. Thus, lottery tickets of distinct lottery decks may be selectively distributed to consumer terminals in a variety of different ways for controlled distribution.

In one embodiment, the interactive game is described by computer firmware or software accessed via one or more local memory modules 136. Alternatively, computer-executable code for the interactive game may be included in the ticket information as executable or interpreted code instructions, either or both embedded in or linked to a remote server 270, 274, 279 or database 271, 272, 275, 277 by reference for retrieval via the network 282. A server 270, 274, 279 may store a plurality of games and may additionally provide promotional-style access to games drawn to a particular product or service. The servers may include additional authentication requirements and/or identify a consumer wishing to participate in particular games (perhaps by presented ticket, consumer loyalty/membership number, etc.). Consumer information and/or game information may be maintained anywhere on the network 282, but are generally copied to segments in local memory modules 136, 138 for rapid access. In another embodiment, a server 270, 274, 279 may use identification information identified consumers authenticated via activity at a gaming, gambling, and/or other establishment connected to the network 282. Consumer identification and authentication may also take place on specific network devices. For example, consumers may be provided interfaces on displays of a kiosk 201 where identifying information can be entered, or a card reader or scanner may be used to present identification (e.g., consumer club member card, etc.) to identify the consumer prior to performing a particular, targeting, or special gaming event.

Referring to step 855, the consumer provides one or more game play action inputs during the interactive game. This may include physical or soft-button presses of the kiosk 201 during interaction with the interactive game. The game play action input may include any number of distinct inputs using a variety of input devices and should not limited to those expressly recited herein.

In one embodiment, the game play action input has no bearing upon the outcome of the ticket as specified in the ticket information. Thus, the entire outcome of the printed ticket may be known to the kiosk 201 prior to initiation of the interactive game, and any input provided by the consumer will not alter the outcome of the ticket. However, the consumer input may indeed alter aspects of either or both of the hidden and non-hidden portion of the ticket in such a way that the outcome (e.g., award amount) of the ticket is unchanged. Thus, while the outcome of the ticket may not directly altered by the consumer input, the presentation of the sections of the ticket (e.g., layout), and possibly even operation of the interactive game may be directly impacted and significantly altered.

Referring to step 860, the interactive game play concludes and the results of the interactive game are presented to the consumer. In one embodiment, this includes reveal of at least some of the ticket information or an associated indicator thereof. As cited in prior examples, the revealing of an instant win prize amount in response to selected indicia 357, an outcome result based on the result of a rotating wheel 358, or a set of predefined indicia 359 for a winning combination may be displayed/performed by the GUI 300 and displayed to the consumer. In another embodiment, a consumer may be given an opportunity to select one or more indicia that will be printed on the resulting on-demand lottery ticket, providing some customization that does not impact the corresponding prize amount or outcome of the ticket. A variety of other interactive game functions may occur that do not depart from the overall spirit and scope of the invention.

Referring to step 870, components of the ticket information, derived image information based upon the game play input, and any additional image-related content are rendered together as a single ticket image for printing by the consumer terminal, for example, using a raster image processor. In short, the image of the printed ticket is formed in memory prior to the resultant digital transfer to a printer for projection onto lottery ticket media. The ticket image printing data may take into consideration one or more formats for the data combined to create the rasterized ticket image, the size of the target media, the format of target media (e.g., layout of the hidden portion of the lottery media), etc. The resulting printing data is used for printing images for the lottery ticket that includes the hidden and non-hidden portions of the lottery ticket media. The assembly and rendering of the ticket imagery may involve information retrieval from a plurality of entities as discussed prior.

Referring to step 880, one or more printers (e.g., printer 50, 150, 250) projects the derived ticket image to the lottery ticket media. In one embodiment, a thermal printer is used to print both the hidden and non-hidden portions of a lottery ticket in a single process as previously described.

Referring to step 899, the lottery ticket is presented to the customer to complete the purchase. Thus, the lottery ticket becomes available to the consumer to reveal a hidden portion of the ticket and fully display an outcome for the lottery ticket. In one embodiment, the combination of the hidden and non-hidden portions of the lottery ticket are collectively used to generate the ticket outcome. Upon presentation of the ticket for redemption (e.g., step 720), a back-end lottery ticket management system may be used to determine or verify an award amount based on one or more identifications of the ticket being redeemed.

Referring to FIG. 13, a process 900 is described for the operation of a kiosk 201 and other components of the lottery system 200 for using a randomized element to generate lottery tickets in one embodiment. The operation of the process 900 and the operation of process 800 share many similarities. Local and remote data and information access calls may be performed in similar ways via network 282, 288 and/or internal network(s) regardless of the specifics of processes 800, 900. Further, the processes 800, 900 should not be expressly limited to the specific steps recited herein. Various modifications of the processes 800, 900 may occur that do not change the overall spirit and scope of the invention, and the express operations recited for each step should not be strictly relied upon as specifically limiting.

The embodiment shown in FIG. 13 uses a network-accessible, back-end ticket game management system (e.g., server 270, 274, 279, etc.) to provide ticket information to derive outcomes for lottery tickets using partially or entirely random generated elements. Further, the ticket outcomes may involve interactive games and consumer-based game play input. Similar to process 800, ticket game theme, lottery ticket image information, and partial ticket outcomes may be retrieved from the same server, a local network server, or any other network entity managing such resources. The process 900 may print lottery tickets that conform to the requirements for Class II or Class III gaming under the Indian Gaming Regulatory Act. The process 900 provides a way for a consumer to interact with a terminal such that the lottery ticket outcome as specified in retrieved ticket information is altered by the consumer input. The ticket outcome may be altered on the resultant printed lottery ticket (either partially or entirely), optionally in combination with one or more randomly generated numbers, random events, or consumer specification. In one embodiment, the consumer interacts with a point-of-sale terminal (e.g., kiosk 201) to control or define some or all of the outcome of a lottery ticket generated on-demand.

Referring to step 905, a consumer terminal (e.g., kiosk 201) presents a menu of options for facilitating on-demand lottery ticket selection and purchase. One such menu of options may be seen in each of FIGS. 4-6. A wide variety of other presentations and/or user interfaces may be employed to help a consumer inspect products they may be interested in purchasing.

Referring to step 910, a consumer selects one or more menu options that specify a desired on-demand lottery ticket for purchase and printing, e.g., selecting one or more indicia 330. An associated one or more interactive games may be specified and described as part of the selection process.

Referring to step 915, a consumer selects any ticket-specific attributes desired for the ticket(s) being purchased. For example, a consumer may specify one or more of ticket denomination, a number of tickets to be purchased, game jurisdiction, game theme, and any other required or desired additional information. A consumer may also be prompted to select or submit one or more symbols or images used to conduct the lottery game or decorate the lottery ticket as printed.

Referring to step 920, a confirmation of the lottery ticket purchase takes place, for example, using an "Add to Cart" button 352 or a "Buy Now" button 353. Once the purchase is confirmed, a vending balance may be altered in accordance with the purchase. Other functions may also take place that may be necessary to complete the transaction, for example, consumer identification (e.g., to record loyalty points or authentication), redemption of loyalty points or assigned awards to obtain tickets, or a transfer of funds from one or more accounts to the vending credit amount. In one embodiment, the consumer selection information may include additional information that is not selected by the consumer, for example, one or more of a consumer identification number, a session identification value, a kiosk identifier, an assigned name for a selected game, a kiosk and/or consumer status indicator, a seed value for ticket or pool selection, a current date/time combination indication, etc.

Referring to step 925, consumer selection information related to the specified attributes for the purchased lottery ticket are generated and transmitted to one or more network-accessible computing machines performing as a back-end game and ticket management system (e.g., server 270, 274, 279, etc.). In essence, this transmission is a request on behalf of the consumer terminal (e.g., kiosk 201) to participate in a particular game with ticketed entries and receive ticket generation information from the ticket management system. In one embodiment, the ticket management system provides information used to derive components of an outcome for the lottery ticket and supply the imagery used to ultimately print hidden and/or non-hidden portions of the lottery ticket on-demand.

Referring to step 930, a look-up process is performed by the ticket management system to determine at least a portion of the ticket information for delivery to the consumer terminal. The ticket management system may perform a query of a table based using an ordered value or a randomized process determining various details for the generated ticket. In one embodiment, a game pool ticket database is used to lookup a partial outcome and associated image information for the lottery game and printed ticket. The ticket management system may sequentially determine a partial outcome for the ticket or use one or more random or pseudo-random numbers to select one ticket outcome from a set of available ticket outcomes present in the pool. The ticket management system processes the received information to determine the ticket information for delivery to the consumer terminal for further interacting with the consumer and generating one or more sections of the lottery ticket on-demand.

In one embodiment, an input value is used for a predefined deterministic function that may include use of a pseudo random number generator to produce an output value used to retrieve a partial or full ticket outcome from a ticket pool or prize matrix. In some embodiments, multiple ticket pools and/or prize matrices may be simultaneously defined and additional information may be provided or required to derive one or more portions of a ticket outcome and the associated ticket information.

Referring to step 940, the ticket information for the on-demand ticket of the lottery game is generated, assembled, and transmitted to the consumer terminal. In one embodiment, the ticket information includes an indication of at least some of the hidden and non-hidden image portions of the printed lottery ticket. Additionally, the ticket information may include an indication of revealed symbols, prizes, multipliers, outcome modifiers, etc., that are revealed as part of the interactive game associated with the ticket purchase. The ticket information may optionally include additional information about one or more of the consumer, the lottery game, prior or current transactions, the requesting client, or other information.

An on-demand lottery ticket can be at least partially generated from the received ticket information. For example, the ticket information may include data enabling a receiving system to assemble one or more portions or components for an on-demand printed lottery ticket. A ticket management and generation system server may create parts of an image-based lottery ticket representation and transmit the ticket representation as part of the ticket information for processing by the kiosk or printer. In other embodiments, the ticket information includes a unique ticket or outcome identifier associated with a set of attributes for a particular partial ticket outcome and is transmitted to a requesting client. The unique ticket or outcome identifier may be used to retrieve some or all of the ticket outcome and/or associated image data from one or more remote systems to dynamically assemble the ticket imagery on-demand. As detailed prior, a ticket outcome included in the ticket information may require redemption or inspection of one or more prior lottery tickets that must be scanned or otherwise presented in order for a consumer to participate in an ongoing episodic lottery game. The resulting ticket information may include transactional information or other identifying information used to modify the ticket information such that persistent information may be maintained from lottery ticket to lottery ticket.

Referring to step 945, the consumer client terminal makes a random number (or pseudo-random number) functional call to an RNG to determine at least one random element for the interactive game and/or the ticket outcome. The random element may be used to randomize one or more aspects of the interactive game for the consumer or provide an additional randomization that will impact the outcome of the printed lottery ticket. For example, the random element may dictate how the indicia 357 are mapped to available prizes (e.g., FIG. 4), the outcome of a spinning wheel 358 (e.g., FIG. 5), or a set of numbers or symbols used to determine an outcome for the ticket (e.g., FIG. 6).

Along the same lines, a random number generated from an RNG call may be required to generate an outcome for the printed lottery ticket that is equivalent to a casino wagering game. For example, consider a lottery ticket that emulates ten free spins of a traditional slot machine where the reels outcome for each spin are reflected in a row of symbols revealed when sections of a hidden portion of a scratch lottery ticket are removed. In other embodiments, the ticket information may be combined with one or more RNG, consumer selections, and probabilistic manipulations to create dynamically generated and printed instant lottery scratch tickets having a fixed value of return-to-player (RTP) over time (e.g., reflecting the outcome of a randomized wagering game on a lottery ticket). The RNG calls may be used to impact a ticket outcome in a variety of additional ways without departing from the overall spirit and scope of the invention.

In other embodiments where the consumer may be directly queried for interactive game input, an RNG call may have little or no impact on the outcome of the lottery ticket and may not be necessary to conduct. For example, if the ticket information specifies a set of five indicia for the consumer to pick from (already in a particular randomized or specified order), there is no need to further randomize ordering. In this example, additional RNG calls are unnecessary and would not be conducted.

Referring to step 950, an interactive game is presented to the consumer on the client terminal. In one embodiment, the consumer kiosk 201 combines one or more components of the received ticket information with results from one or more RNG calls to present the interactive game to the consumer. The interactive game may be purely randomly based and even contain elements of skill.

As detailed prior, a GUI 300 and/or an interactive game presented via GUI 300 may be specified in the ticket information and used to present and control the interactive game on the kiosk 201. In one embodiment, the interactive game may include a provision for the consumer to sacrifice a selection to make a replacement selection (e.g., FIG. 4) or to choose the desired selection from a set of selected indicia after reveal. In another embodiment, the interactive game may include the consumer to determine a speed of rotation for the wheel 358 that may alter the outcome of the spin (e.g., FIG. 5). Further, the interactive game may include an opportunity for a consumer to select one or more "personal lucky numbers" to match against "computer generated lucky numbers" to determine prizes for the outcome of the ticket (e.g., FIG. 6). In all these cases, the combination of received ticket information and consumer input may be combined to dynamically generate an outcome for an on-demand printed lottery ticket.

In another embodiment, the ticket information may include information related to a persistent or episodic game in progress. The ticket information may be used to alter the outcome (or potential outcome) of the currently generated lottery ticket using a combination of consumer input and episodic information. For example, each lottery ticket purchased may maintain a balance of the vending machine credit present at the time of ticket printing. In another embodiment, each additional episodic lottery ticket purchased increases the potential top prize for the ticket. In another embodiment, the prize value for identified combinations may increase.

In the case of episodic lottery tickets and games, one or more remote servers may be accessed to obtain transactional information associated with a presented and identified consumer or ticket. Using this retrieved information, additional information for one or more components of the hidden and non-hidden portions of the ticket may be used in presenting the outcome for the ticket. As new lottery ticket information is generated, the ticket information may be updated to reflect the current state of the episodic game in progress.

Referring to step 955, the consumer provides game play action input during interaction with the interactive game presented by the kiosk 201 (e.g., via GUI 300). The game play action input may include any number of distinct inputs using a variety of input devices and should not limited to those expressly recited herein.

In one embodiment, the interactive game combines one or more components of a ticket outcome specified by the ticket information with the results of one or more RNG calls and/or consumer selections during conduct of the interactive game. In other embodiments, the interactive game may present all, some, or none of the ticket information as part of the interactive game.

Any of the ticket information may be expressly specified or modified by one or more of the RNG call or consumer game play inputs. The number of indicia 357, the values of revealed indicia 357, the entries on the wheel 358, the numbers of indicia 359, etc., may all be altered to change the outcome of the resulting lottery ticket. In the event that an RNG call is unnecessary for the interactive game (e.g., a purely skill-based game), the outcome of the lottery ticket may be altered directly by the consumer game play input and the results of the interactive game.

The combination of the ticket information, one or more random elements, and the game play action input are ultimately used to derive an outcome specific to the printed lottery ticket. Any determination of what aspects of the ticket outcome are presented as part of the interactive game, as well as imagery presented in the hidden or non-hidden portions of the lottery ticket media, are a matter of implementation. The derived ticket outcome may take a number of differing forms and a single outcome may be displayed in a number of different ways. For example, consumer-selected numbers required to match computer generated numbers may be part of a revealed or hidden part of the interactive game as well as being part of a hidden and/or non-hidden portion of a resulting printed lottery ticket. The invention should not be limited to displaying a clear indication of the game play input data in a non-hidden part of the lottery ticket, although, this will occur in some embodiments.

Referring to step 960, after the interactive game play concludes, results of the interactive game are presented to the consumer. As noted, only a portion of the ticket outcome may be revealed to the consumer at this point (for example, the results of the consumer selections). However, a game designer is free to display as much information as desired to the consumer regarding the game play action input and/or any derived ticket outcome. In one embodiment, the interactive game concludes with a confirmation of the selections that a consumer has made or an indication of one or more RNG calls performed at the kiosk 201. Typically, an entire indication of the ticket outcome is not presented to the consumer anywhere but the printed lottery ticket itself.

Referring to step 965, the results of the game play action input results are sent by the kiosk 201 to a game and ticket management system for recordation and association with a ticket identifier and/or a transactional identifier. The generated, assembled, and transmitted information may include any or all of the ticket information received by the kiosk 201 and indications of the input or results derived as a result from the consumer input. In one embodiment, a database record is established that includes a reference to the ticket information, an indication of the game play action input results, and a reference to a corresponding award associated with the ticket. In other embodiments, information may be stored in a centralized or other distributed manner. In any event, information is maintained to ensure that an attempt to present the lottery ticket for redemption or verification of outcome is possible.

The reception, storage, and transmission format for lottery tickets and game play action input and results may be standardized and secured to deter improper tampering and/or third-party inspection. Likewise communication between any two systems may include one or more security processes or algorithms to ensure that information transfer is not compromised during rendering or transit. A number of known secure communication methods may be used including the Game to System® (G2S®) open standard protocol to ensure communication security. The way information is assembled, formatted, encrypted, transmitted, and interpreted may occur in a variety of ways and should intrinsically limit the spirit and scope of the invention.

Referring to step 970, information derived from the ticket information, RNG calls, game play action input, and/or any additional ticket image-related content are rendered together as a single image for printing the lottery ticket onto lottery ticket media. This may occur using a raster image processor to rasterize the assembled data according to one or more defined ticket layouts that conform to the target lottery ticket media. In short, an image of the printed ticket is formed in memory prior to transfer to a printer for projection to lottery media. The ticket image printing data may take into consideration some or all of the ticket information in addition to some or all of the results of the game play action input. The ticket image printing data will generally conform to a format compatible with the target lottery ticket media on which the on-demand lottery ticket will be printed. The specified printing layout and the lottery ticket media combine to provide the hidden and non-hidden portions of the lottery ticket to which the printing is performed.

Referring to step 980, the ticket image is transferred by one or more printers from memory to the lottery ticket media. In one embodiment, a thermal printer is used to simultaneously print both the hidden and non-hidden portion of the lottery ticket as previously described. That is, the lottery ticket is printed in a single pass, printing the hidden and non-hidden portions as arranged on the lottery ticket. In another embodiment, the lottery ticket is printed in stages. For example, the non-hidden portion of the lottery ticket may be printed first and the hidden portion of the lottery ticket is performed after such information is determined. The order and layout of printing the ticket imagery on the lottery ticket media is a matter of specific implementation.

Referring to step 999, the lottery ticket is presented to the customer to complete the purchase and transaction. The lottery ticket becomes available for the consumer to reveal the entirety of the outcome of the lottery ticket. Thus, a consumer may reveal the symbols obscured in the hidden portion of the ticket to display an outcome for the lottery ticket and determine a corresponding award for the ticket. In some embodiments, the combination of the hidden and non-hidden portion of the lottery are collectively used to generate an outcome for the lottery ticket.

The lottery ticket may be verified and/or redeemed for prizes at a suitable location, e.g., a kiosk 201, some other customer service facility, or via code entry using a computer in communication with an online clearinghouse or back-end lottery ticket management system. The ticket identifier, transaction identifier, or an accessed outcome identifier may be used to determine the corresponding award amount for the lottery ticket by access to some or all of the ticket information associated with the lottery ticket. Further, various components of the ticket information related to a lottery ticket, which may or may not include episodic ticket and game information, may also be retrieved, processed, and/or inspected.

The processes described above are merely illustrative embodiments of a method for providing generation of tickets on-demand. Such illustrative embodiments are not intended to limit the scope of the invention, as any of numerous other implementations for performing the invention. None of the claims set forth below are intended to be limited to any particular implementation of a method of providing consumer incentives, unless such claim includes a limitation explicitly reciting a particular implementation. Numerous modifications and other illustrative embodiments are within the scope of one of ordinary skill in the art and are contemplated as falling within the spirit and scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for any means-plus-function limitations recited in the following claims, the means are not intended to be limited to the means disclosed herein for performing the recited function, but are intended to cover in scope any means, known now or later developed, for performing the recited function.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A system comprising:
- a gaming terminal including an electronic display device, one or more electronic input devices, and a printer; and
- one or more controllers configured to:
  - receive, via at least one of the one or more electronic input devices, consumer input indicative of a purchase of a scratch ticket and one or more game play actions, the scratch ticket having a non-hidden portion and a hidden portion, the hidden portion covered by opaque material;
  - generate one or more random elements; and
  - in response to the consumer input, print, by the printer, imagery at the hidden and non-hidden portions of the scratch ticket determining a game outcome, the imagery at the hidden portion being based on the random elements, the imagery at the non-hidden portion being based on the game play actions.

2. The system of claim 1, wherein the one or more game play actions alter the game outcome.

3. The system of claim 2, wherein the one or more game play actions alter a probability of receiving an award for the game outcome.

4. The system of claim 2, wherein the one or more game play actions alter a base award for the game outcome by multiplying the base award, adding a supplemental award to the base award, or increasing a maximum award amount.

5. The system of claim 2, wherein the one or more game play actions are indicative of winning criteria against which the random elements are compared.

6. The system of claim 1, wherein the one or more controllers are remote from the gaming terminal.

7. The system of claim 1, wherein the hidden portion includes one or more number-bearing islands covered by the opaque material, the opaque material being fractured for partial removal.

8. The system of claim 1, wherein the one or more game play actions occur in an interactive game played on the electronic display device.

9. A gaming terminal comprising:
an electronic display device;
one or more electronic input devices;
a printer; and
one or more controllers configured to:
receive, via at least one of the one or more electronic input devices, consumer input indicative of a purchase of a scratch ticket and one or more game play actions, the scratch ticket having a non-hidden portion and a hidden portion, the hidden portion covered by opaque material;
determine one or more numbers based on one or more random elements; and
in response to the consumer input, print, by the printer, imagery at the hidden and non-hidden portions of the scratch ticket determining a game outcome, the imagery at the hidden portion being based on the random elements, the imagery at the non-hidden portion being based on the game play actions.

10. The terminal of claim 9, wherein the one or more game play actions alter the game outcome.

11. The terminal of claim 9, wherein the printer is a thermal printer and the opaque material is heat-conductive foil fractured for partial removal.

12. The terminal of claim 9, wherein the imagery for the non-hidden portion of the scratch ticket includes instructions for determining an associated award based upon the imagery of the hidden portion.

13. The terminal of claim 9, wherein the non-hidden portion includes the one or more numbers.

14. The terminal of claim 9, wherein the non-hidden portion includes one or more additional numbers based on the game play actions.

15. A method of operating an on-demand scratch ticket system, the system including one or more controllers and a terminal including an electronic display device, one or more electronic input devices and a printer, the method comprising:
receiving, via at least one of the one or more electronic input devices, consumer input indicative of a purchase of a scratch ticket and one or more game play actions, the scratch ticket having a non-hidden portion and a hidden portion, the hidden portion covered by opaque material;
generating one or more random elements; and
in response to the consumer input, printing, by the printer, imagery at the hidden and non-hidden portions of the scratch ticket determining a game outcome, the imagery at the hidden portion being based on the random elements, the imagery at the non-hidden portion being based on the game play actions.

16. The method of claim 15, wherein the game play actions occur during an interactive game played on the electronic display device and alter the game outcome.

17. The method of claim 16, wherein the one or more game play actions are indicative of winning criteria against which the random elements are compared.

18. The method of claim 16, wherein the one or more game play actions alter a base award for the game outcome by multiplying the base award, adding a supplemental award to the base award, or increasing a maximum award amount.

19. The method of claim 16, wherein the one or more game play actions alter a probability of receiving an award for the game outcome.

20. The method of claim 15, wherein the hidden portion includes one or more number-bearing islands covered by the opaque material, the opaque material being fractured for partial removal.

* * * * *